US012671150B2

(12) United States Patent
Hwangbo et al.

(10) Patent No.: US 12,671,150 B2
(45) Date of Patent: Jun. 30, 2026

(54) CYLINDRICAL BATTERY CELL, AND BATTERY PACK AND VEHICLE INCLUDING THE SAME

(71) Applicant: LG Energy Solution, Ltd., Seoul (KR)

(72) Inventors: Kwang Su Hwangbo, Daejeon (KR); Do Gyun Kim, Daejeon (KR); Minki Jo, Daejeon (KR); Suji Choi, Daejeon (KR); Kwang Hun Ko, Daejeon (KR); Dasom Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/328,216

(22) Filed: Jun. 2, 2023

(65) Prior Publication Data

US 2023/0395950 A1     Dec. 7, 2023

(30) Foreign Application Priority Data

Jun. 3, 2022   (KR) ........................ 10-2022-0068532
Feb. 27, 2023  (KR) ........................ 10-2023-0026174

(51) Int. Cl.
*H01M 50/533*     (2021.01)
*H01M 10/04*      (2006.01)
        (Continued)

(52) U.S. Cl.
CPC ..... *H01M 50/533* (2021.01); *H01M 10/0431* (2013.01); *H01M 10/049* (2013.01);
        (Continued)

(58) Field of Classification Search
CPC ............. H01M 50/152; H01M 50/169; H01M 50/166; H01M 50/30; H01M 50/342; H01M 50/3425
See application file for complete search history.

(56) References Cited

U.S. PATENT DOCUMENTS 8,551,645 B2    10/2013  Hyung et al.
2005/0153194 A1*  7/2005  Kimura ............... H01M 50/627
                                    429/174
(Continued)

FOREIGN PATENT DOCUMENTS

CN      207504025 U    6/2018
CN      207765484 U    8/2018
        (Continued)

OTHER PUBLICATIONS

Extended European Search Report including Written Opinion for Application No. 23176578.5 dated Dec. 7, 2023, pp. 1-15.
(Continued)

*Primary Examiner* — Amanda J Barrow
(74) *Attorney, Agent, or Firm* — Lerner David LLP

(57)     ABSTRACT

A cylindrical battery cell includes a battery can accommodating a jelly-roll type electrode assembly therein, and a cap covers and closes an open end of the battery can. The cap is bonded to a tab of an electrode of the electrode assembly. The cap includes two or more electrode connecting portions, each of which protrudes into the interior of the battery can along the axial direction. The electrode connecting portions are spaced apart from one another in a circumferential direction about a center of the cap, and at least two of the electrode connecting portions are positioned on opposing sides of the center of the cap. The cap functions as both a current collector plate and the cap, thus increasing energy density. Manufacturing methods are also disclosed, as is a battery pack including the battery cell and a vehicle equipped with the battery pack.

26 Claims, 34 Drawing Sheets

(51) Int. Cl.

| | |
|---|---|
| *H01M 50/107* | (2021.01) |
| *H01M 50/152* | (2021.01) |
| *H01M 50/179* | (2021.01) |
| *H01M 50/342* | (2021.01) |
| *H01M 50/536* | (2021.01) |
| *H01M 50/538* | (2021.01) |
| *H01M 50/645* | (2021.01) |

(52) U.S. Cl.

CPC ....... *H01M 50/107* (2021.01); *H01M 50/152* (2021.01); *H01M 50/179* (2021.01); *H01M 50/3425* (2021.01); *H01M 50/536* (2021.01); *H01M 50/538* (2021.01); *H01M 50/645* (2021.01)

(56) References Cited

U.S. PATENT DOCUMENTS

| | | | | |
|---|---|---|---|---|
| 2005/0287428 | A1* | 12/2005 | Cheon | H01M 50/528 429/211 |
| 2006/0024572 | A1* | 2/2006 | Lee | H01M 10/0431 429/161 |
| 2006/0068276 | A1 | 3/2006 | Yoo et al. | |
| 2009/0087733 | A1* | 4/2009 | Yoon | H01M 50/171 429/246 |
| 2010/0233519 | A1* | 9/2010 | Cheon | H01M 10/0431 429/56 |
| 2012/0297611 | A1 | 11/2012 | Ma | |
| 2012/0321924 | A1 | 12/2012 | Ahn | |
| 2016/0141561 | A1 | 5/2016 | Watanabe et al. | |
| 2018/0090741 | A1 | 3/2018 | He et al. | |
| 2020/0235369 | A1 | 7/2020 | Jeong et al. | |
| 2020/0365856 | A1 | 11/2020 | Kim et al. | |
| 2021/0218095 | A1 | 7/2021 | Narbonne et al. | |
| 2021/0399393 | A1 | 12/2021 | Zehavi et al. | |
| 2022/0200108 | A1* | 6/2022 | Kim | H01M 10/0422 |
| 2022/0271345 | A1* | 8/2022 | Lim | H01M 50/531 |
| 2022/0271403 | A1* | 8/2022 | Lim | H01M 50/536 |
| 2023/0299395 | A1* | 9/2023 | Fang | H01M 50/538 429/164 |
| 2024/0145783 | A1* | 5/2024 | Lee | H01M 50/538 |

FOREIGN PATENT DOCUMENTS

| | | | | |
|---|---|---|---|---|
| CN | 212113760 | * | 12/2020 | ........... H01M 10/04 |
| CN | 212113760 | U | 12/2020 | |
| CN | 213483820 | U | 6/2021 | |
| CN | 113346201 | U * | 9/2021 | ........ H01M 10/0525 |
| CN | 215266481 | U | 12/2021 | |
| CN | 113921765 | A | 1/2022 | |
| CN | 215869707 | U | 2/2022 | |
| CN | 114142079 | A | 3/2022 | |
| CN | 114221073 | * | 3/2022 | .......... H01M 10/052 |
| CN | 114221073 | A | 3/2022 | |
| CN | 216085200 | U | 3/2022 | |
| CN | 216389534 | U | 4/2022 | |
| CN | 216720234 | U | 6/2022 | |
| CN | 220491999 | U | 2/2024 | |
| EP | 3547392 | A1 | 10/2019 | |
| EP | 3783685 | A1 | 2/2021 | |
| EP | 3916891 | A1 | 12/2021 | |
| EP | 3920296 | A1 | 12/2021 | |
| EP | 3975283 | A1 | 3/2022 | |
| JP | 2003229166 | A | 8/2003 | |
| JP | 4401634 | B2 | 1/2010 | |
| JP | 2015103308 | A | 6/2015 | |
| JP | 6811003 | B2 | 1/2021 | |
| JP | 2021064458 | A | 4/2021 | |
| KR | 20060010484 | A | 2/2006 | |
| KR | 2006-0028059 | A | 3/2006 | |
| KR | 2007-0082969 | A | 8/2007 | |
| KR | 101252969 | B1 | 4/2013 | |
| KR | 101473391 | B1 | 12/2014 | |
| KR | 2019-0040699 | A | 4/2019 | |
| KR | 20200078640 | A | 7/2020 | |
| KR | 2020-0134534 | A | 12/2020 | |
| KR | 20210053214 | A | 5/2021 | |
| KR | 2022-0050706 | A | 4/2022 | |

OTHER PUBLICATIONS

Search Report dated May 17, 2024, from the Office Action for Chinese Application No. 202310658354.4 Issued May 22, 2024, pp. 1-3.

Search Report dated Jan. 17, 2025 from the Office Action for Chinese Application No. 202310658354.4 issued Jan. 18, 2025. 3 pages. (see p. 1-2).

Communication pursuant to Article 94(3) EPC from European Application No. 23176578.5, dated Feb. 28, 2025, 7 pages.

* cited by examiner

CYLINDRICAL BATTERY CELL, AND BATTERY PACK AND VEHICLE INCLUDING THE SAME

CROSS-REFERENCE TO RELATED APPLICATION

This application claims priority from Korean Patent Application No. 10-2022-0068532, filed on Jun. 3, 2022, and Korean Patent Application No. 10-2023-0026174, filed on Feb. 27, 2023, the disclosures of which are incorporated herein by reference in their entirety.

BACKGROUND

1. Field of the Invention

The present invention relates to a cylindrical battery cell, a manufacturing method thereof, a battery pack including the same, and a vehicle including the same.

2. Discussion of Related Art

Cylindrical battery cells have a structure in which a jelly-roll type electrode assembly is accommodated inside a cylindrical metal can, which is more robust in standing up to impacts or high temperatures compared to pouch-type batteries. Thus, the demand is increasing for utilizing can-type cells as battery cells used in battery packs for vehicles.

However, since cans are made of a metal, can-type cells may weigh more than pouch-type batteries. Thus, research is being actively carried out in connection with increasing electrical capacity by increasing the interior volume of each battery can.

A process of manufacturing a battery cell using a cylindrical can includes a can preparation operation of deep drawing a metal sheet to form a circular bottom and a circular tube-shaped side wall connected to the circular bottom, as well as positioning, insulating, and sealing a first electrode terminal in the center of the circular bottom of the can. The process further includes an operation of preparing a jelly-roll type electrode assembly having opposing end portions in the axial direction at which a first current collector plate and a second current collector plate, respectively, are provided. The process also includes an assembly operation of accommodating the electrode assembly in the can, connecting the first current collector plate to the first electrode terminal, connecting the second current collector plate to the can or a cap, filling an inside of the can with an electrolyte, and closing an open end of the side wall with the cap to finish the manufacturing of the battery cell.

In the cylindrical battery cell manufactured as described above, since a space for accommodating the second current collector plate should be provided inside the can, the volume of the electrode assembly is inevitably reduced by as much as that space, which results in the lowering of energy density. In addition, the conventional process of manufacturing a cylindrical battery cell includes fabricating the second current collector plate and the additional process of connecting it to a second electrode of the electrode assembly, which increases the manufacturing costs of the battery cell.

SUMMARY OF THE INVENTION

The present invention may beneficially provide a battery cell in which the reliability of an electrical connection between an electrode of an electrode assembly and an electrode terminal of a battery can is provided despite omitting a current collector plate for connecting the electrode assembly to the electrode terminal of the battery can.

The present invention may also beneficially provide a battery cell which can reduce manufacturing costs by reducing the number of parts and manufacturing man-hours and being simple.

The present invention may also beneficially provide a battery cell, which has a high energy density and is advantageously installed in a vehicle, and a battery pack and a vehicle including the same.

An aspect of the present invention provides a battery cell. Such battery cell desirably includes a battery can, an electrode assembly, and a cap. The battery can preferably includes a side wall extending in an axial direction between a closed end and an opposing open end, where the open end defines an opening into the interior of the battery can. The electrode assembly preferably includes two electrodes received within the interior of the battery can so that at least one tab extending from a second one of the electrodes is positioned proximate the open end of the battery can. The cap is preferably positioned to close the open end of the battery can by covering the opening. The cap preferably includes multiple electrode connecting portions protruding into the interior of the battery can along the axial direction so as to make direct electrical contact with at least one tab of the second electrode. Such electrode connecting portions are preferably spaced apart from one another in a circumferential direction about a center of the cap, and at least two of the electrode connecting portions are preferably positioned on opposing sides of the center of the cap from one another.

In accordance with at least some aspects of the invention, the electrode connecting portions and the tab(s) of the second electrode may be connected by a welded portion.

In accordance with at least some aspects of the invention, the at least one tab may include multiple tabs extending along a radial direction orthogonal to the axial direction, such that the tabs at least partially overlap one another along the axial direction.

In accordance with at least some aspects of the invention, each of the electrode connecting portions may be elongated along a radial direction of the cap. In accordance with at least some aspects of the invention, there may be four electrode connecting portions equally spaced apart in the circumferential direction.

In accordance with some of such aspects, each of the electrode connecting portions may be elongated linearly along a respective radial direction.

In accordance with at least some aspects of the invention, the electrode connecting portions may be joined to one another by a protruding portion of the cap located in a radially central region of the cap, which protruding portion protrudes into the interior of the battery can along the axial direction.

In accordance with at least some aspects of the invention, the electrode connecting portions may be joined to one another by a protruding portion of the cap extending circumferentially around a radially outer region of the cap, which protruding portion protrudes into the interior of the battery can along the axial direction.

In accordance with at least some aspects of the invention, the cap may include an electrically conductive material which, along a radially outer edge of the cap, makes electrical contact with the side wall of the battery can at the open end. The electrode connecting portions may be monolithically formed with the electrically conductive material of the cap. In some examples, each of the electrode connecting portions may correspond to a respective recess formed in an outer surface of the cap that faces away from the interior of the battery can along the axial direction.

In accordance with at least some aspects of the invention, the cap may include a liquid inlet in a central portion of the cap. Such liquid inlet may be positioned on a central protruding region of the cap, which central protruding region may be disposed farther away from the interior of the battery can along the axial direction than a respective contact surface of each of the electrode connecting portions. Such contact surfaces may be ones that make direct electrical contact with the tab(s) of the second electrode.

According to some of the above aspects of the invention, intermediate regions of the cap may be defined between the circumferentially spaced apart electrode connecting portions. Such intermediate regions may be disposed farther away from the interior of the battery can along the axial direction than the contact surfaces of the electrode connecting portions. In some of such aspects of the invention, the central protruding region of the cap may be spaced apart radially from the intermediate regions by a portion of an outer surface of the cap that is disposed closer to the interior of the battery can along the axial direction than both the central protruding region and the intermediate regions. In others of such aspects of the invention, the central protruding region of the cap may directly adjoin the intermediate regions in the radial direction.

In accordance with at least some aspects of the invention, the cap may include a vent. Such vent may be positioned radially outwardly from the electrode connecting portions.

In accordance with at least some aspects of the invention, a first electrode terminal is positioned along the closed end of the battery can. Such electrode terminal may be electrically insulated from the closed end of the battery can. Moreover, the first electrode of the electrode assembly may be electrically connected to the first electrode terminal via a first current connector plate positioned between the electrode assembly and the closed end of the battery can in the axial direction.

In accordance with at least some aspects of the invention, the cap may be constructed and arranged such that an outermost extremity of the cap along the axial direction away from the interior of the battery can is spaced farther from the interior of the battery can along the axial direction than the open end of the battery can.

In accordance with at least some aspects of the invention, the electrode connecting portions may be positioned on opposing sides of the center of the cap such that a straight line connecting them would extend through the center of the cap.

In accordance with at least some aspects of the invention, the electrode connecting portions may be elongated along a radial direction. Moreover, in some of such aspects, the electrode connecting portions may be elongated linearly along a straight line extending through the center of the cap.

Another aspect of the present invention provides a method of manufacturing a battery cell like that discussed above. Such method desirably includes assembling the battery cell, then, after assembling the battery cell, bonding the electrode connecting portions to the at least one tab of the second electrode, as well as bonding the cap to the battery can and injecting an electrolyte into the battery can. The assembling of the battery cell preferably includes positioning the electrode assembly in the interior of the battery can and positioning the cap to cover the opening at the open end of the battery can so as to close the open end of the battery can.

In accordance with at least some aspects of the above invention, the injecting of the electrolyte into the battery can may be via a liquid inlet in a central portion of the cap. Some of such aspects may further include covering the liquid inlet with a stopper.

In accordance with at least some aspects of the above invention, the bonding of the plurality of electrode connecting portions to the at least one tab of the second electrode may be performed by laser irradiation of an outer surface of the cap facing away from the interior of the battery can along the axial direction.

Other aspects of the present invention provide a battery pack including a battery cell like that discussed above, as well as a vehicle including such battery pack.

According to some implementations of the present invention, since a cap is directly electrically connected and fixed to a tab of a second electrode, and the cap is electrically connected and fixed to a side wall of a can, a current collector plate can be omitted. Thus, the energy density of a battery cell can be increased, the number of parts of the battery cell can be reduced, and the manufacturing process can be simplified. Therefore, it is possible to reduce the manufacturing costs of the battery cell.

According to some implementations of the present invention, since an electrode connecting portions of the cap connected to one or more tabs of a second electrode extend in a radial direction, the cap is electrically directly connected from a winding center of the second electrode to an outer circumference thereof so that internal resistance can be significantly reduced.

According to some implementations of the present invention, since the cap is provided with a plurality of electrode connecting portions extending in the radial direction, and each of the electrode connecting portions are recessed downwardly so as to protrude into the interior of the battery can along the axial direction and towards the tab(s) of the second electrode, adhesion between each electrode connecting portion and the tab(s) of the second electrode can be secured with good quality bonding therebetween.

The above shape is believed to significantly improve the deformation resistance of the cap. Moreover, it is believed that it will also lead to an increase in the strength of the connection between the perimeter of the cap and open end of the battery can. Therefore, bonding quality between the battery can and the cap can be significantly improved.

According to some implementations of the present invention, since the electrode connecting portions of the cap are radially disposed at equal intervals in the circumferential direction, deformation resistance can be uniformly secured in the circumferential direction, and current paths can be evenly distributed.

According to some implementations of the present invention, since a pair of electrode connecting portions facing each other across the center of the cap are aligned in a line, a shape of a jig for press-fitting the cap into the battery can or pressing the cap against the electrode assembly can be implemented simply, and the trajectory of welding lines can be simplified.

According to some implementations of the present invention, since four electrode connectors are disposed at 90 degree intervals, the distortion resistance of the cap can be enhanced, the welding process can be simplified, bonding strength between the plurality of electrode connecting portions and the tab(s) of the second electrode can be increased.

Moreover, locations of plastic deformation of the cap are beneficially minimized so as to reduce any degradation in rigidity of the cap.

According to some implementations of the present invention, radially outer sides of the plurality of electrode connecting portions may be brought into contact with an inner circumferential surface of the battery can to serve as a press-fitting connection that guides the central alignment of the cap with respect to the battery can. Thus, in the process of press-fitting the cap into the battery can, the center of the cap can be naturally aligned with the battery can.

According to some implementations of the present invention, since the press-fitted depth of the cap is limited by the electrode connecting portions, the electrode connecting portions and the tab(s) of the second electrode can be bonded in a state in which adhesion therebetween is sufficiently secured.

According to some implementations of the present invention, since an outermost surfaces of the cap, which are positioned axially above a bonded portion joining the cap and the battery can, such bonded portion can be protected.

Then, when the battery can is placed correctly, that is, when the outermost surfaces are placed on the floor, the outermost surfaces support the load of the battery cell. In such case, the outermost surfaces positioned on both sides of each of the electrode connecting portions in the circumferential direction exhibits the effect of pressing the electrode connector toward the tab of the second electrode. Thus, possible damage to the bonded portions between the cap and the tab(s) of the second electrode due to vibrations or impacts can be minimized.

A liquid inlet may be provided in a central portion of the cap can diversify the processes of manufacturing the battery cell. In addition, by having the liquid inlet protrude from the electrode connecting portions, the transfer of any welding heat or bonding heat to the electrode assembly when the liquid inlet is sealed with a stopper can be minimized.

When a vent provided in the cap is provided radially outside of the electrode connecting portions or a welded portion, an area of the cap where the internal pressure of the battery acts can be widely secured. Thus, a venting action can occur more easily, and when the vent area is broken by venting, an electrical connection between the second electrode and the battery can be blocked.

BRIEF DESCRIPTION OF THE DRAWINGS

The above and other objects, features and advantages of the present invention will become more apparent to those skilled in the art by the following detailed descriptions of exemplary embodiments of the invention, with reference to the accompanying drawings, in which.

DETAILED DESCRIPTION OF EXEMPLARY EMBODIMENTS

Figure 1:
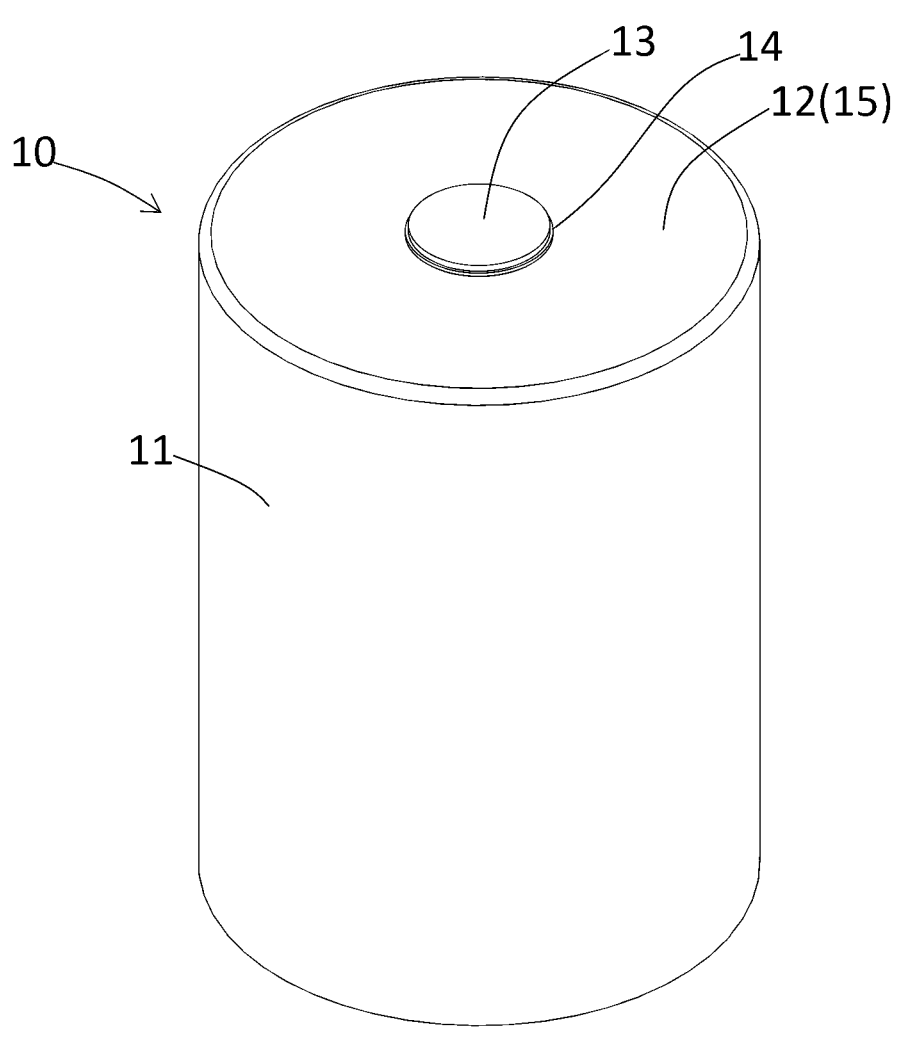
FIG. 1 is a perspective view illustrating a cylindrical battery cell according to an embodiment.

The above objects, features and advantages will be described below in detail with reference to the accompanying. In describing the present invention, a detailed description of known technology related to the present invention is omitted where it may unnecessarily obscure the subject matter of the present invention. In the drawings, the same reference numerals are used to indicate the same or similar components.

Although "first," "second," and the like may be used to describe various components, these components are not limited by these terms. These terms are only used to distinguish one component from another component, and unless otherwise stated, the first component may be the second component and vice versa.

Throughout the specification, unless otherwise stated, each component may be singular or plural. Moreover, singular expressions used herein include plural expressions unless the context clearly dictates otherwise.

Hereinafter, the arrangement of an arbitrary component on the "upper portion (or lower portion)" or "upper (or lower)" of a component means that an arbitrary component is placed in contact with the upper (or lower) surface of the component. In addition, it may mean that other components may be interposed between the component and any component disposed on (or under) the component.

In addition, when a component is described as "linked," "coupled," or "connected" to another component, the components may be directly connected or connected to each other, but other components may be "interposed" between each "component," or each component may be "linked," "coupled," or "connected" through other components.

Throughout the specification, when "A and/or B" is stated, it means A, B, or A and B, unless otherwise specified, and when a range of "C to D" is stated, it means C or more and D or less, unless otherwise specified.

In describing embodiments, an axial direction refers to a direction in which an axis constituting a winding center of a jelly-roll type electrode assembly extends, a radial direction refers to a direction towards or away from that axis, and a circumferential direction refers to a direction along a circumference of a circle centered on and surrounding the axis.

A width direction of the electrode assembly prior to rolling into a jelly roll corresponds to the axial direction of a jelly roll. A length direction of the electrode assembly prior to rolling into a jelly roll corresponds to a circumferential direction of the jelly roll.

Hereinafter, a structure of a cylindrical battery cell according to embodiments of the present invention will be described with reference to FIGS. 1 to 8.

The form factor of the battery cell refers to a value representing the diameter and height of a cylindrical battery cell. Cylindrical battery cells according to embodiments of the present invention may be, for example, 46110 cells, 48750 cells, 48110 cells, 48800 cells, or 46800 cells. In the numerical value representing the form factor, the first two numbers indicate the diameter of the cell in mm, the next two numbers indicate the height of the cell in mm, and the last number ('0') indicates that the cross section of the cell is circular.

A battery cell according to an embodiment of the present invention may be a cylindrical battery cell having a substantially cylindrical shape, a diameter of about 46 mm, a height of about 110 mm, and a form factor ratio of 0.418.

A battery cell according to another embodiment may be a cylindrical battery cell having a diameter of about 48 mm, a height of about 75 mm, and a form factor ratio of 0.640.

A battery cell according to another embodiment may be a substantially cylindrical battery cell having a diameter of about 48 mm, a height of about 110 mm, and a form factor ratio of 0.418.

A battery cell according to another embodiment may be a substantially cylindrical battery cell having a diameter of about 48 mm, a height of about 80 mm, and a form factor ratio of 0.600.

A battery cell according to another embodiment may be a cylindrical battery cell having a substantially cylindrical shape, a diameter of about 46 mm, a height of about 80 mm, and a form factor ratio of 0.575.

Conventionally, battery cells having a form factor ratio of approximately 0.4 or less have been used. That is, conventionally, for example, 18650 cells, 21700 cells, and the like have been used. For an 18650 cell, its diameter is approximately 18mm, its height is approximately 65mm, and the form factor ratio is 0.277. For a 21700 cell, its diameter is approximately 21 mm, its height is approximately 70 mm, and the form factor ratio is 0.300.

A battery can 10 includes a cylindrical side wall 11 extending in an axial direction between a closed first end and an open second end, where the closed first end is defined by a bottom 12 connected to an end portion of one side of the side wall 11 in an axial direction.

A hole may be formed in a central portion of the bottom 12, and a first electrode terminal 13 may be fitted into and coupled to the hole. The first electrode terminal 13 may be riveted and fixed to the bottom 12 in a state in which a terminal gasket 14 is interposed therebetween. The terminal gasket 14 may be interposed between the first electrode terminal 13 and the bottom 12 and may seal the inside and outside of the battery can 10 to prevent leakage of an electrolyte and to electrically insulate the first electrode terminal 13 from the bottom 12.

However, the connection method between the first electrode terminal 13 and the bottom 12 is not limited thereto. For example, various other fixing methods can be used in which a structure creates a seal between the first electrode terminal 13 and the bottom 12 and also electrically insulates the first electrode terminal 13 from the bottom 12, such as a bolt-nut coupling method, a glass seal method, and a maleic anhydride grafted polypropylene (PP-MAH) thermal bonding method.

The first electrode terminal 13 may have a first polarity, and the battery can may have a second polarity. Accordingly, both the bottom 12 of the battery can and the side wall 11 connected thereto may have a second polarity. Thus, the bottom 12 around a circumference of the first electrode terminal 13 may constitute a second electrode terminal 15, and the side wall 11 connected to the bottom 12 may also constitute the second electrode terminal.

Then, both the first electrode terminal 13 and a second electrode terminal 15 may be disposed at an end portion of one side of the battery can 10 in the axial direction. Then, in the battery can 10, both a bus bar connected to the first electrode terminal 13 and a bus bar connected to the second electrode terminal 15 may be positioned at the end portion of one side of the battery can 10 in the axial direction, e.g., at the top of the battery can 10.

In one example, the first electrode terminal 13 may be a positive terminal, and the second electrode terminal 15 may be a negative terminal. Of course, the opposite is possible as well.

Figure 2:
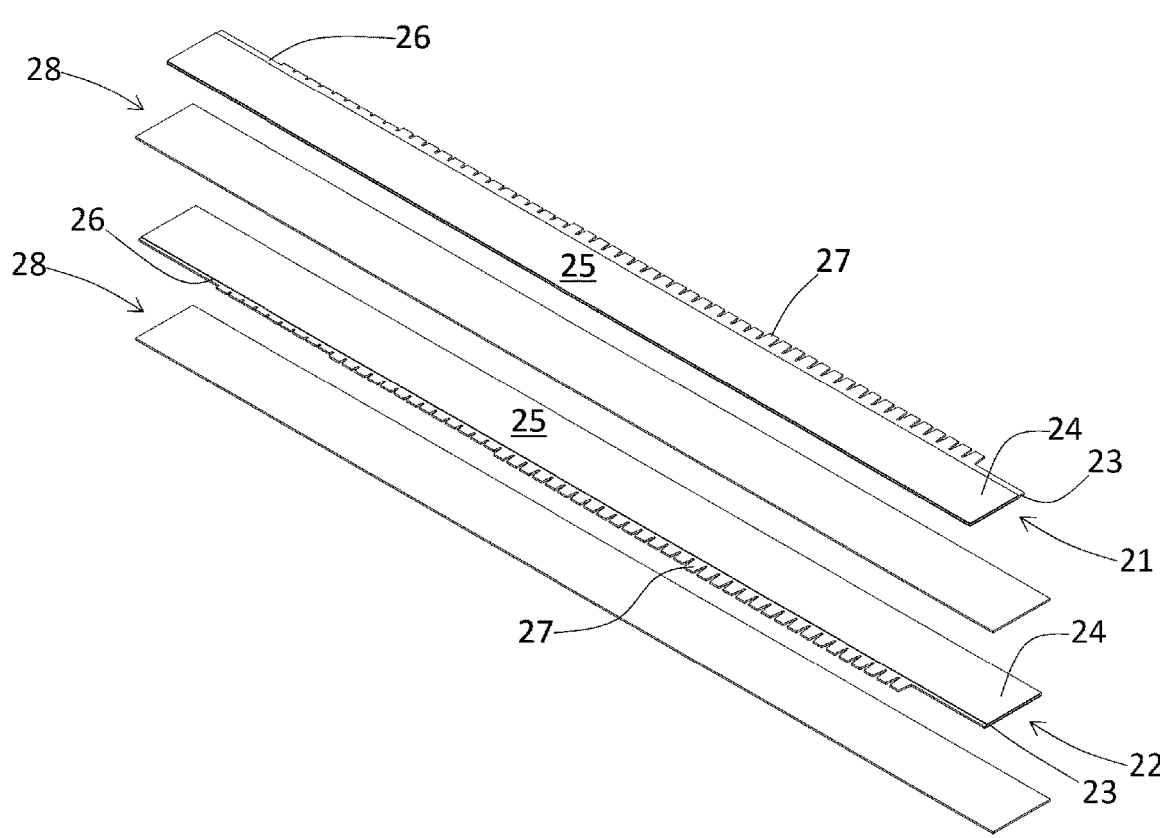
FIGS. 2 and 3 are perspective views respectively illustrating states before and after stacking of a first electrode, a second electrode, and a separator for manufacturing an electrode assembly to be accommodated in a battery can.
Figure 3:
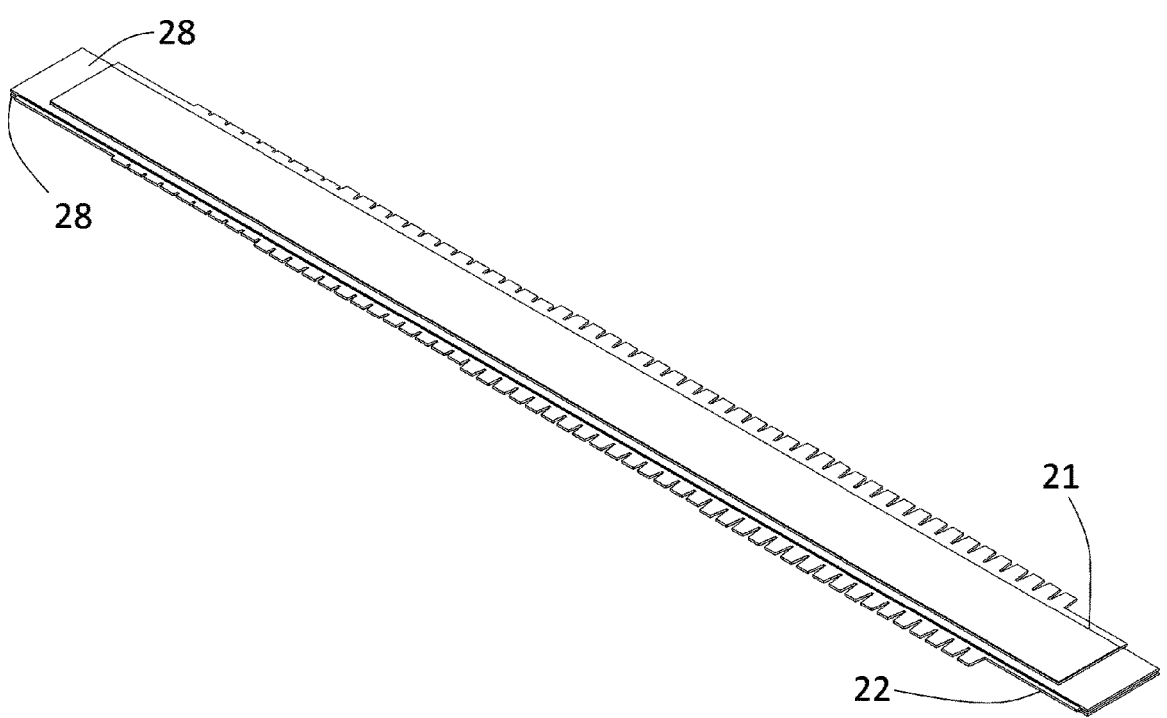
Figure 4:
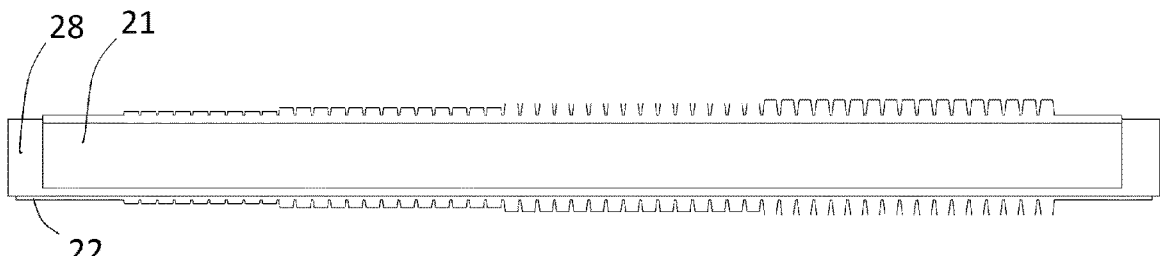
FIG. 4 is a plan view illustrating the stacked state of FIG. 3.

An electrode assembly 20 is accommodated in the interior of the battery can The electrode assembly 20 is manufactured by preparing a first electrode 21, a second electrode 22, and a separator 28, which extend with a predetermined width along a longitudinal direction, as shown in FIG. 2, forming a stacked body by stacking the components in the following order: the first electrode 21, the separator 28, the second electrode 22, and the separator 28, as shown in FIGS. 3 and 4. Then the stacked body is wound around a winding center axis to form a jelly roll configuration.

The first electrode 21 may be a positive electrode, and the second electrode 22 may be a negative electrode. Of course, the opposite is possible as well.

The first electrode 21 and the second electrode 22 are each manufactured in the form of an electrode sheet. The electrode sheet is manufactured by applying an active material layer 24 to a surface of a metal foil 23. The electrode sheet includes a coated portion 25 in which the active material layer 24 is applied and an uncoated portion 26 in which the active material layer 24 is not applied. A positive electrode sheet is provided with the uncoated portion 26 on one side in a width direction, and a negative electrode sheet is provided with the uncoated portion 26 on the opposite side in the width direction.

In the stacked body, the uncoated portion 26 is exposed or protrudes in the width direction. The uncoated portion 26 itself serves as an electrode tab. Although an electrode "tab" as used herein may be an integral part of the metal foil 23 that protrudes outwardly from the electrode assembly 20, such "tab" could also be a separately formed, electrically-conductive component securely and electrically coupled to the current-collecting metal foil 23 of the electrode.

Notched tabs 27 shaped like flags may be formed by forming notches at predetermined intervals in the uncoated portion 26.

In some embodiments, the notched tabs 27 may each have an isosceles trapezoidal shape. However, the notched tabs 27 may have various shapes, such as semi-circular, semi-elliptical, triangular, rectangular, and parallelogram-shaped.

In addition, in some embodiments, notched tabs 27 may be disposed along the length direction and have the same width as one another. However, the widths of the notched tabs 27 may gradually or stepwise widen from a winding center to an outer circumference.

In addition, in some embodiments, the notched tabs 27 may have heights that gradually increase from the winding center to the outer circumference. However, the heights of the notched tabs 27 may alternatively be constant or gradually decreasing.

Figure 5:
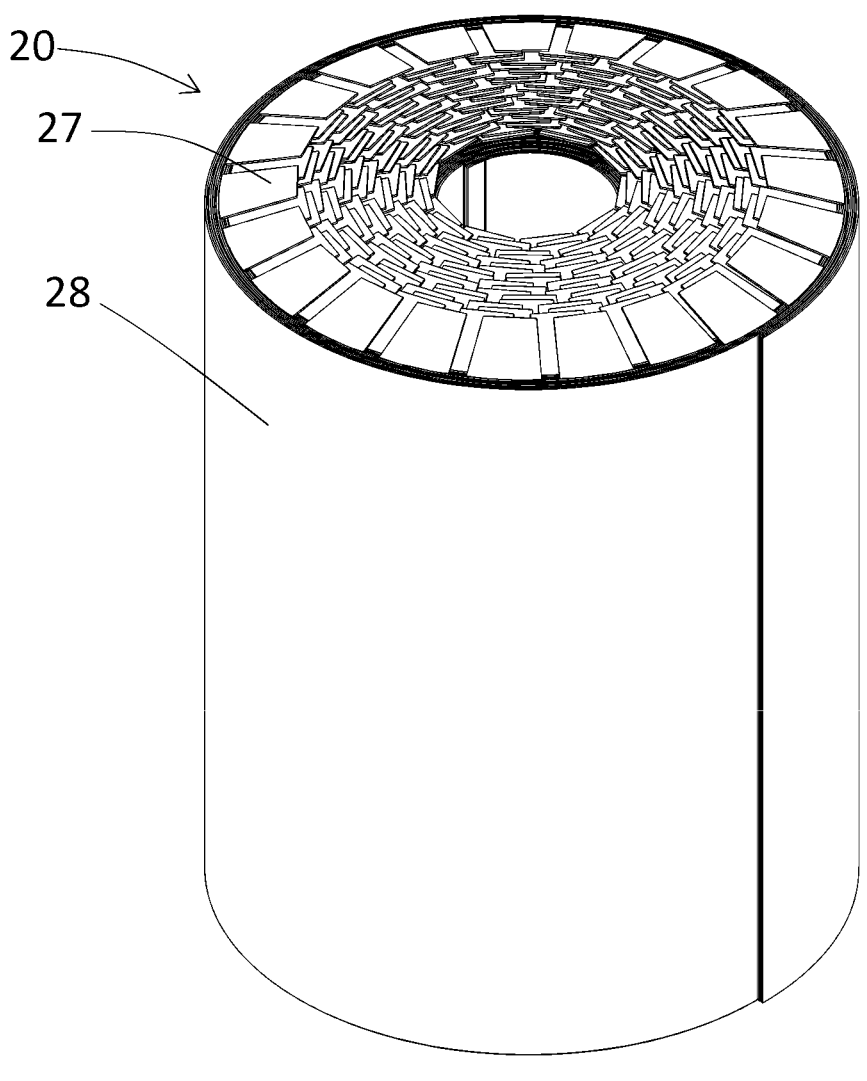
FIGS. 5 and 6 are a perspective view and a side view, respectively, illustrating the electrode assembly manufactured by winding the stacked body of FIGS. 3 and 4 in a jelly-roll form.

In the electrode assembly 20 in the form of a jelly roll, the notched tabs 27 may be bent radially inward or outward in the radial direction. A structure in which the notched tabs 27 are bent radially inward is shown in FIGS. 5 and 6.

The notched tabs 27 may be bent one by one in the process of winding the stacked body to form the electrode assembly 20 having a jelly roll configuration. Alternatively, the notched tabs 27 may be bent at one time after winding the electrode assembly into the jelly roll configuration.

Figure 6:
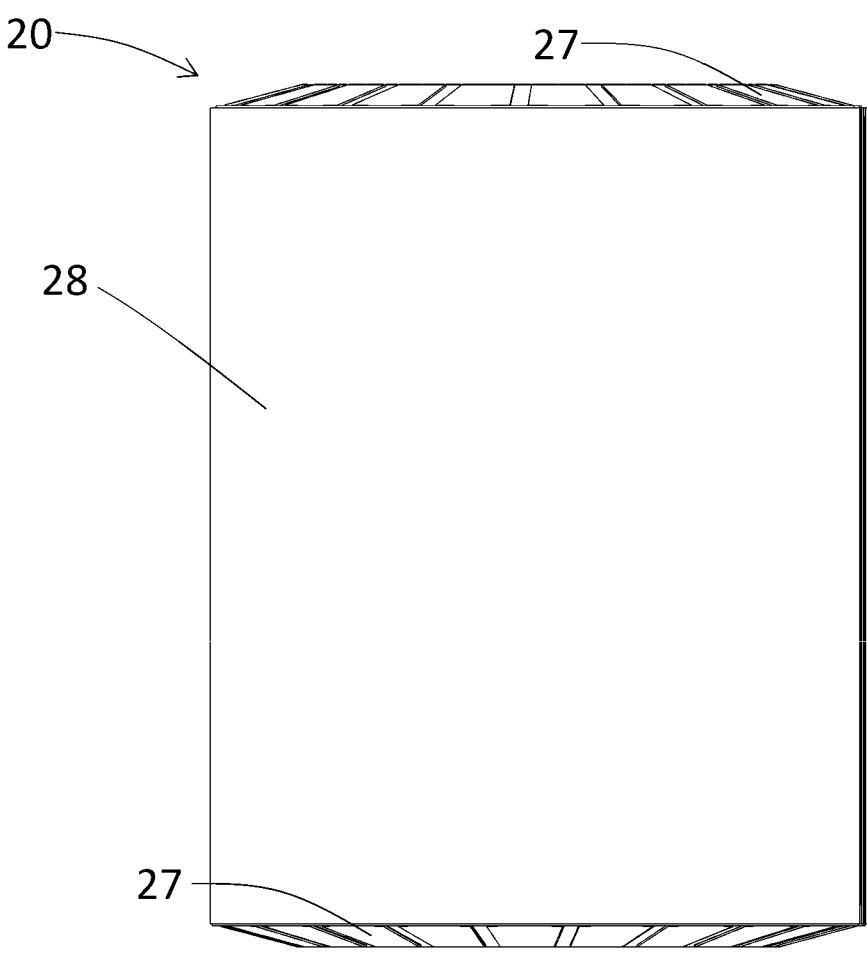

In this way, as shown in FIG. 6, the notched tabs 27 of the first electrode 21 and the notched tabs 27 of the second electrode 22, which are bent and overlap in the radial direction, may define a plane substantially perpendicular to the axial direction at both end portions of the electrode assembly 20 in the axial direction.

Figure 7:
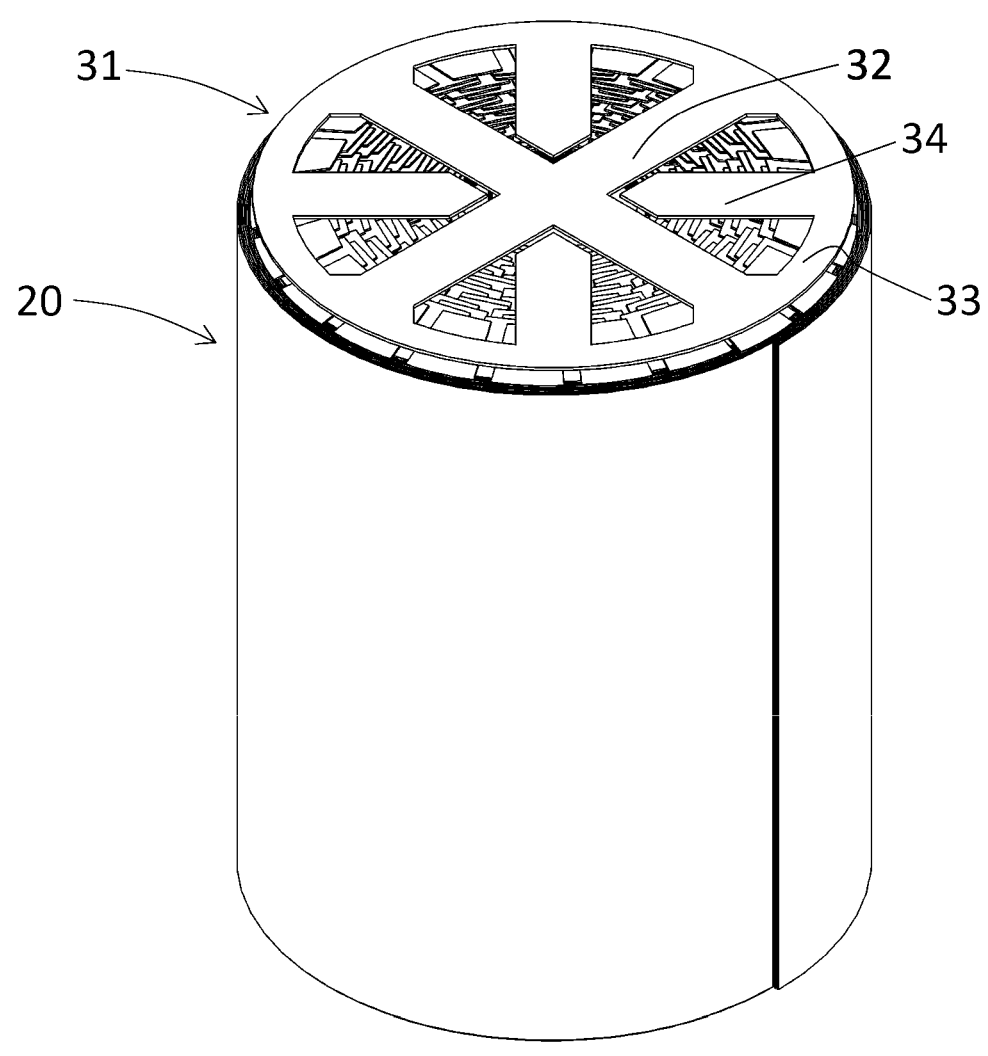
FIGS. 7 and 8 are perspective views illustrating a state in which a current collector plate is bonded to an upper portion of the electrode assembly and the current collector plate is not bonded to a lower portion thereof.

As shown in FIG. 7, a current collector plate 31 may be bonded to the substantially flat surface defined by the radially-bent, notched tabs 27 exposed at the both end portions of the electrode assembly 20.

The current collector plate 31 may be manufactured by punching, trimming, piercing, and/or bending a metal sheet.

Referring to FIG. 7, the current collector plate 31 includes one or more terminal connector portions 32 radially extending from a central portion of the current collector plate 31, a ring portion 33 circumferentially interconnecting radially outer ends of the terminal connector portions 32, and one or more electrode connector portions 34 extending radially inwardly from the ring portion 33 but not connected to the terminal connector portions 32. A central portion of the terminal connector 32 covers at least a portion of a hollow part of the winding center of the electrode assembly 20.

Before the electrode assembly 20 is inserted into the battery can 10, the electrode connectors 34 are bonded to the notched tabs 27 of the first electrode 21 of the electrode assembly 20 by laser welding or the like.

Figure 8:
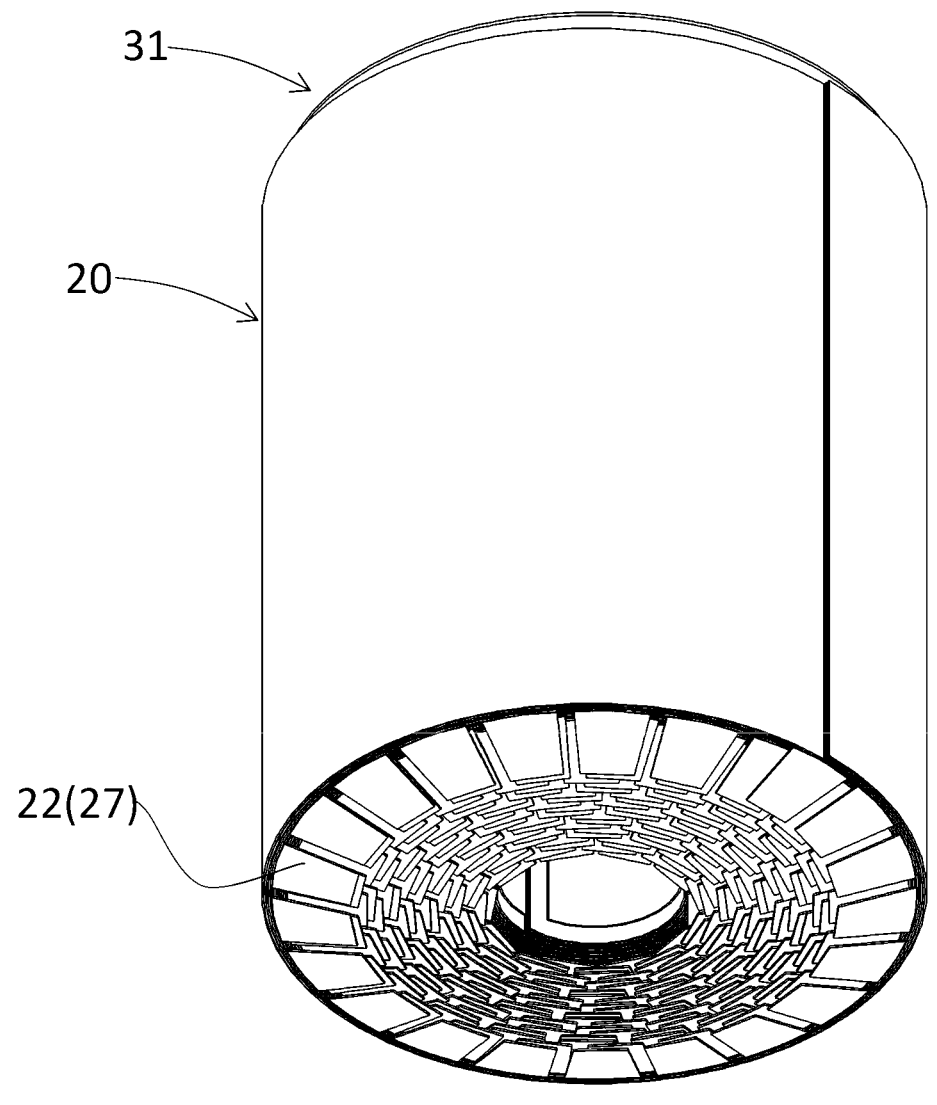

Referring to FIG. 8, a current collector plate may not be connected to the notched tabs 27 of the second electrode 22 of the electrode assembly 20.

Figure 9:
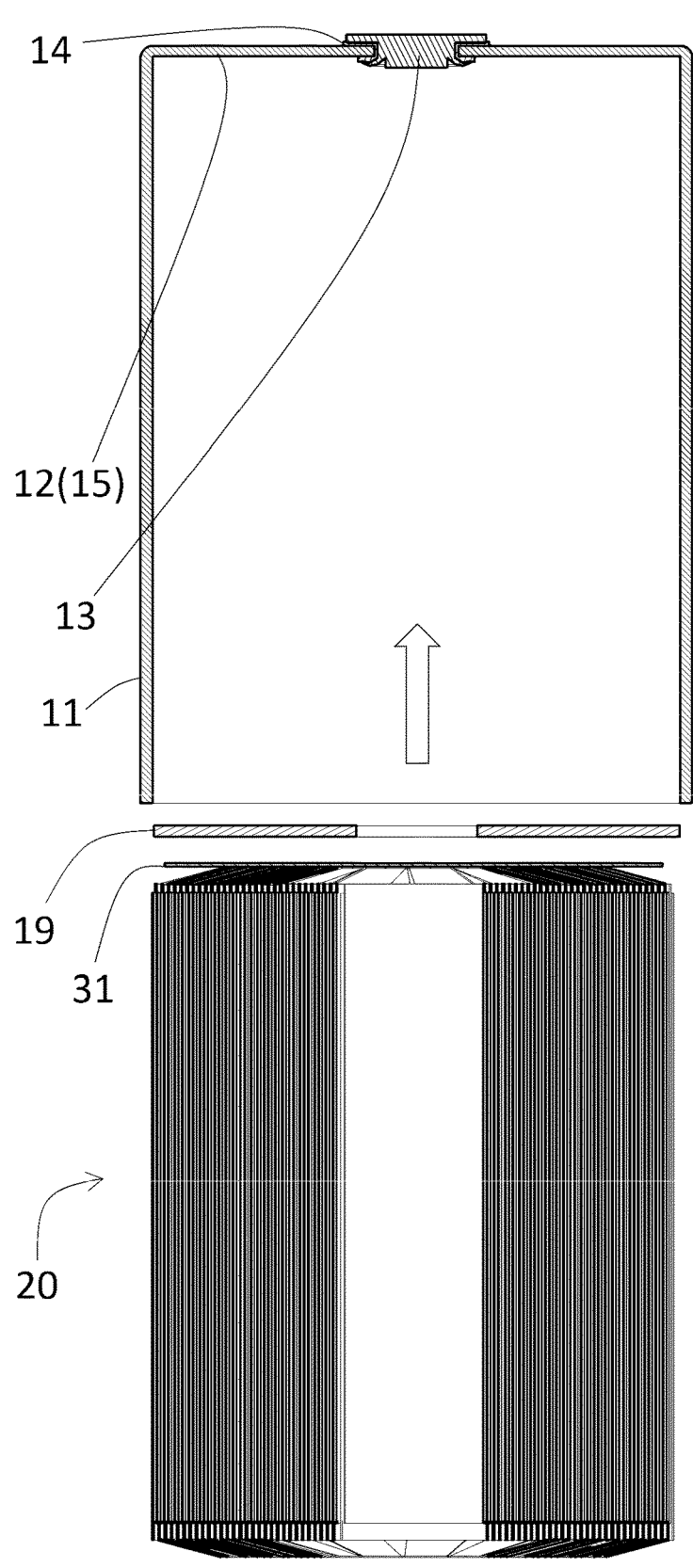
FIG. 9 is a cross-sectional view illustrating a process of accommodating the electrode assembly shown in FIGS. 7 and 8 in the battery can.
Figure 10:
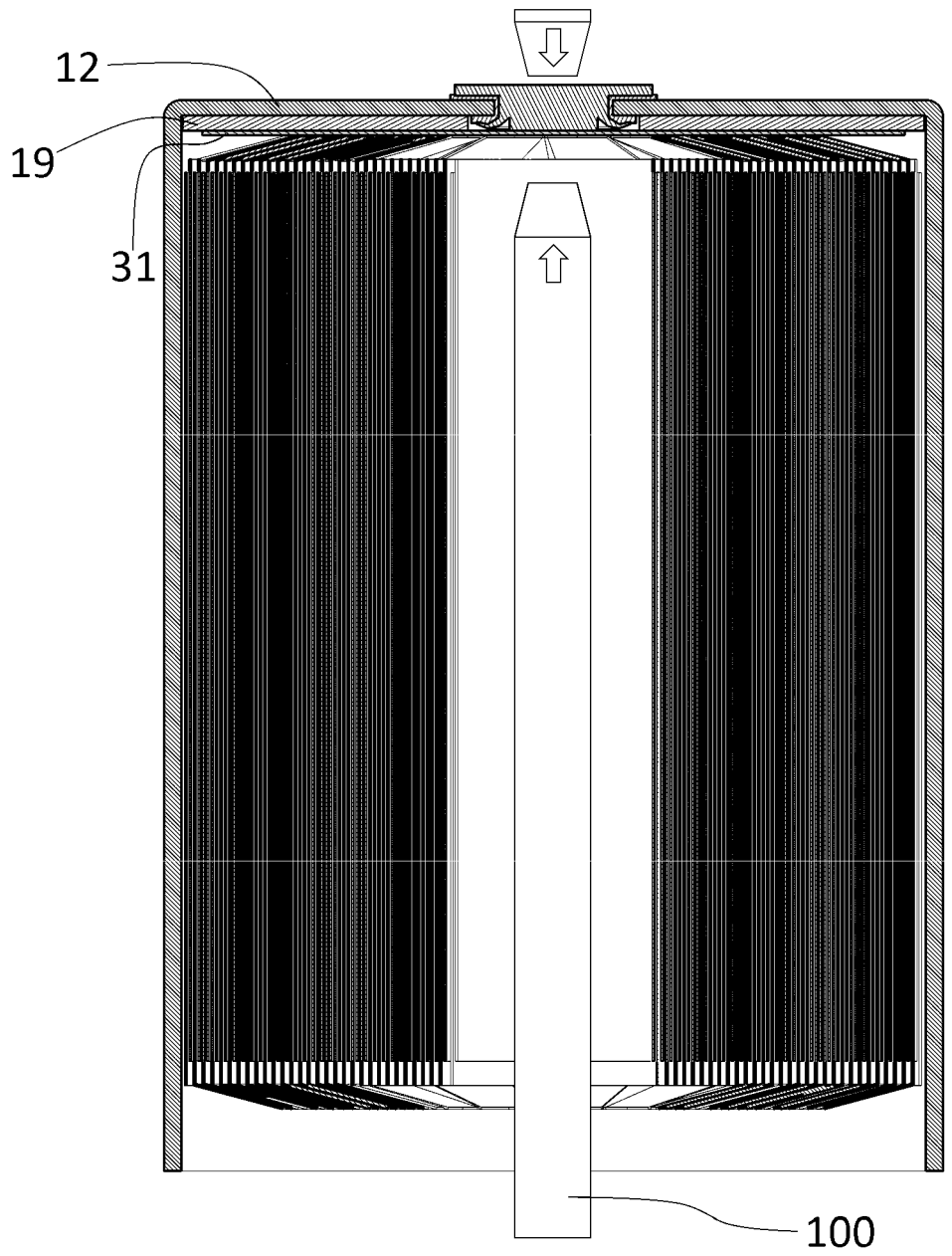
FIG. 10 is a cross-sectional view illustrating a process of welding a first electrode terminal to the current collector plate.

As shown in FIGS. 9 and 10, the electrode assembly 20 is accommodated in the battery can 10 in a state in which the current collector plate 31 is aligned to face the bottom 12 of the battery can 10. In this case, an insulator 19 is interposed between the first current collector plate 31 and the bottom 12 of the battery can 10 to electrically insulate the first current collector plate 31 from the bottom 12.

In addition, the terminal connector 32 of the current collector plate 31 is bonded to the first electrode terminal 13 by resistance welding, ultrasonic welding, or laser welding. A welding device 100 for welding the current collector plate 31 to the first electrode terminal 13 performs welding by axially approaching an inner surface of the center of the terminal connector 32 of the current collector plate 31 through the hollow of the winding center of the electrode assembly 20. Alternatively, the current collector plate 31 and the first electrode terminal 13 may be bonded by brazing or soldering or the like.

Figure 11:
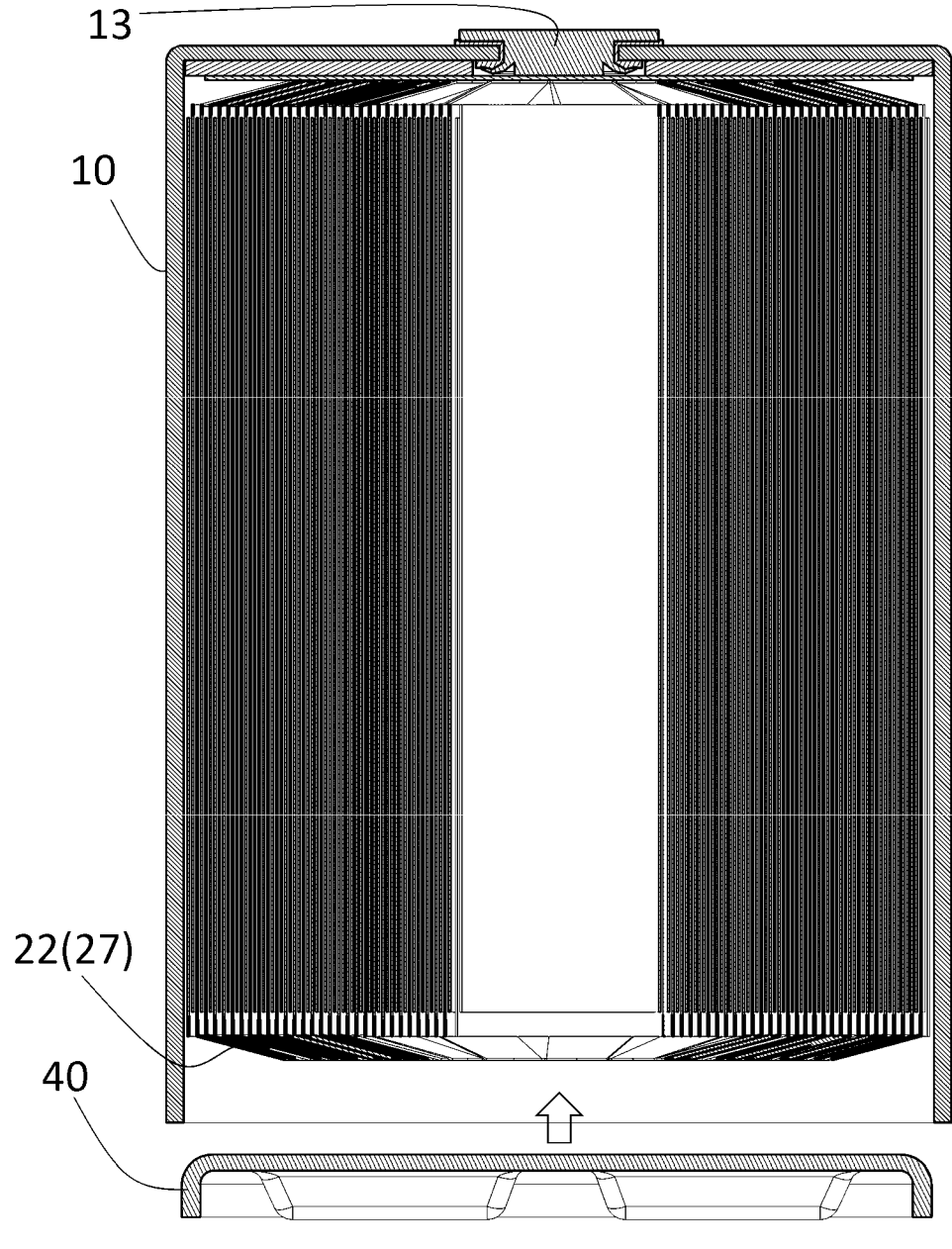
FIG. 11 is a cross-sectional diagram illustrating a process of putting a cap on the battery can.
Figure 12:
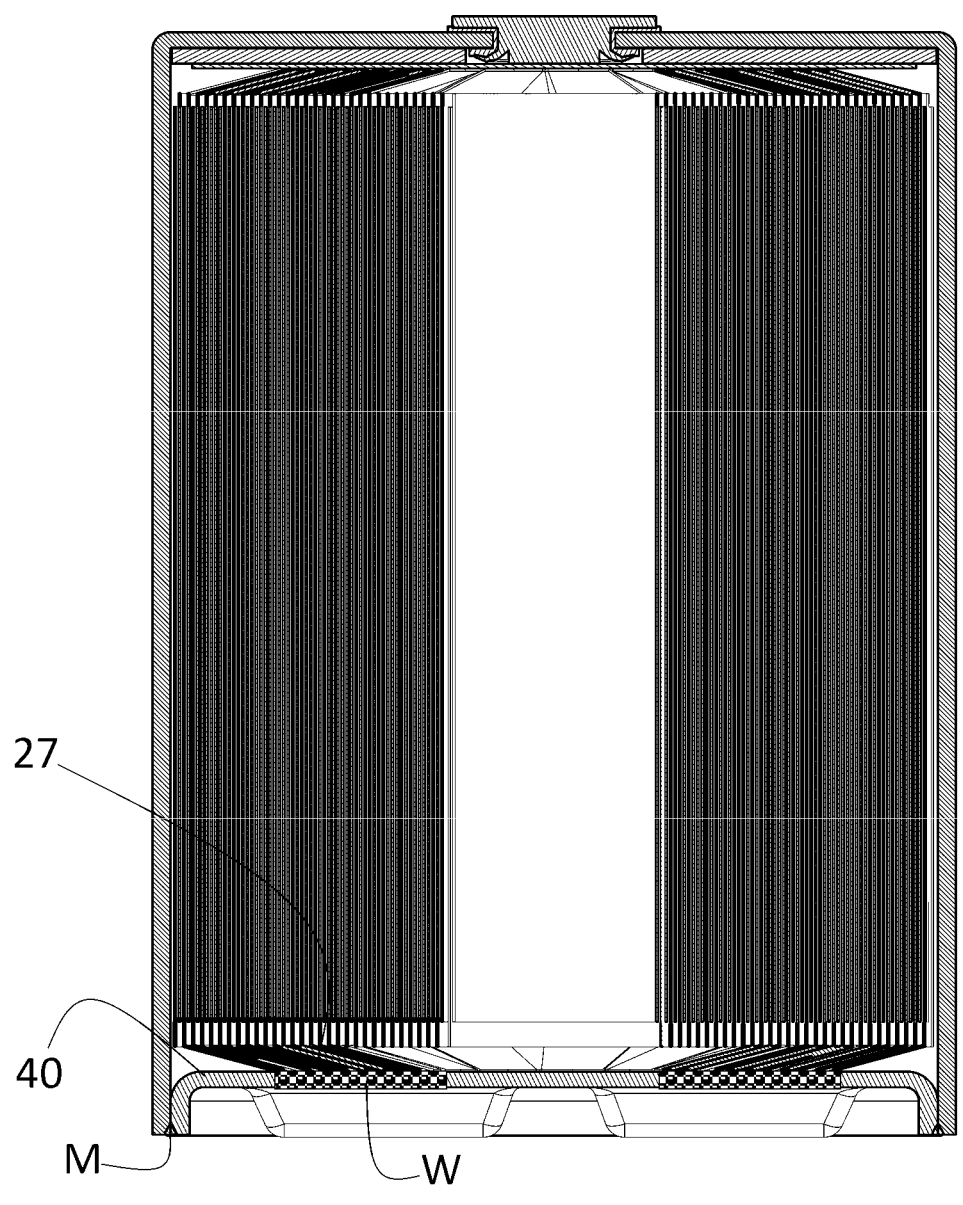
FIG. 12 is a cross-sectional view illustrating a state in which the cap is bonded to a tab of a second electrode of the electrode assembly and the cap is bonded to an edge of the battery can.

Referring to FIGS. 11 and 12, the notched tabs 27 of the second electrode 22 may be directly connected to a cap 40 covering an opening defined by the open end of the battery can 10. The second electrode 22 is electrically connected to the cap 40 via welded portions W between the cap 40 and the notched tabs 27. Alternatively, the notched tabs 27 and the cap 40 may be bonded by brazing or soldering or the like.

The cap 40 is formed of an electrically conductive material. Moreover, the cap 40 may be monolithically formed of such material. An edge of the cap 40 is bonded and electrically connected to the side wall 11 of the battery can 10 and fixedly sealed. Therefore, the second electrode 22 may be electrically connected to the cap 40 and the battery can 10. Various methods, such as welding, brazing, and soldering, capable of achieving an electrical connection and sealing, may be applied to the bonding of the cap 40 and the battery can 10.

The examples of the cap 40 and an assembly process thereof illustrated in FIGS. 11 and 12 are exemplary. Hereinafter, various embodiments of a structure of the cap 40 and an assembly method will be described. Although the bonded portions as described below are bonded by welding, the present invention is not limited thereto.

FIRST EMBODIMENT

Hereinafter, with reference to FIGS. 13 to 18, a first embodiment of a cap and a structure of a battery cell in which the cap is utilized will be described.

The cap 40 may be made of a circular metal sheet. The cap 40 includes one or more electrode connecting portions 41 recessed in a direction corresponding to the axial direction of a battery cell 72. The electrode connecting portions 41 may be formed by stamping, i.e., by pressing the metal sheet using a press and one or more shaped dies. Thus, due to such stamping, each protrusion defined by an electrode connecting portion 41 on the lower side of the cap 40 corresponds to a respective recess in the upper side of the cap.

A bottom of the electrode connecting portions 41 define respective contact surfaces in close contact with and bonded to the notched tabs 27 of the second electrode 22 of the electrode assembly 20. The electrode connecting portions 41 manufactured by press-processing the metal sheet has a thickness that is slightly smaller than a thickness of the metal sheet. Thus, when a surface of the electrode connecting portions 41 is irradiated with a laser L, local heat generated by the laser may melt and bond the electrode connecting portions 41 and surfaces of the notched tabs 27 in contact with the bottom contact surfaces of the electrode connecting portions 41.

Figure 13:
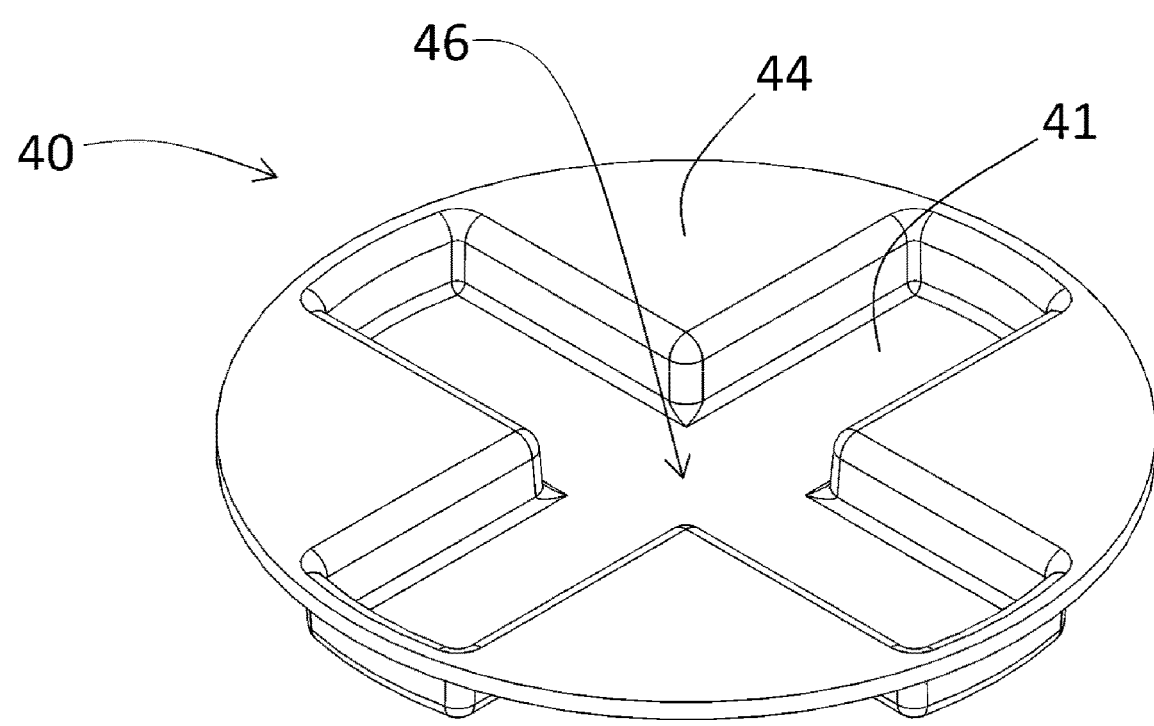
FIGS. 13 to 15 are a top perspective view, a bottom perspective view, and a plan view, respectively, illustrating a cap according to a first embodiment.
Figure 14:
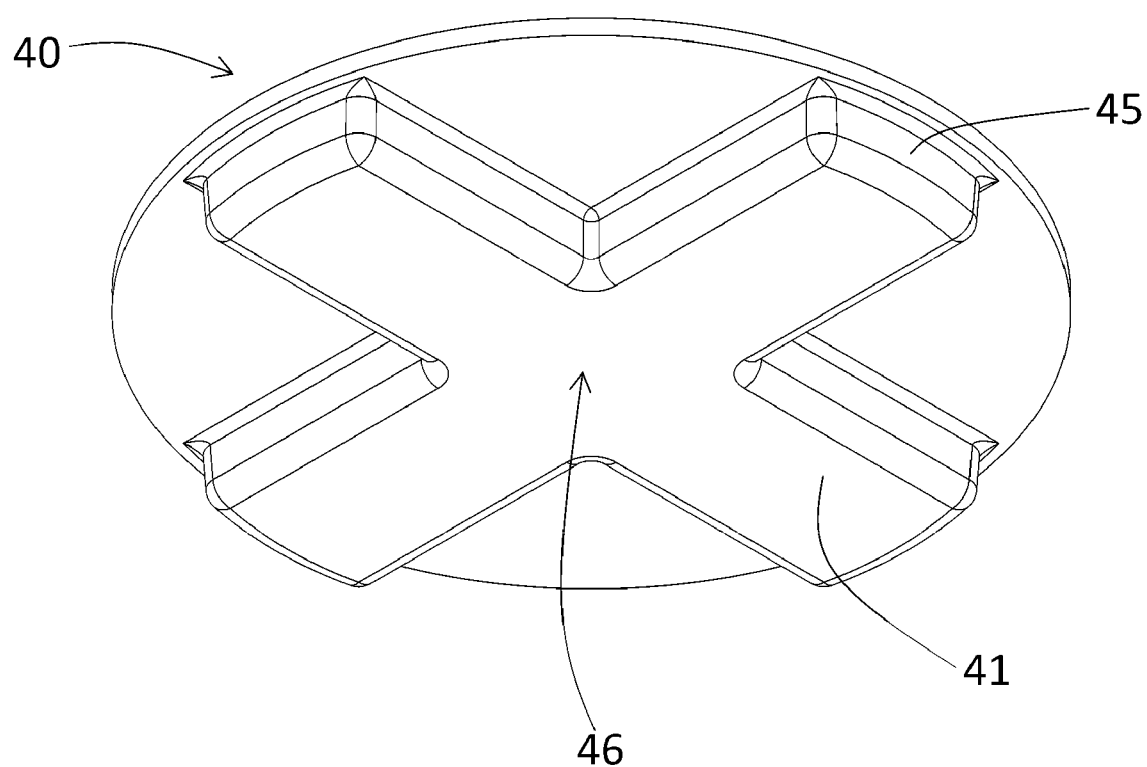
Figure 15:
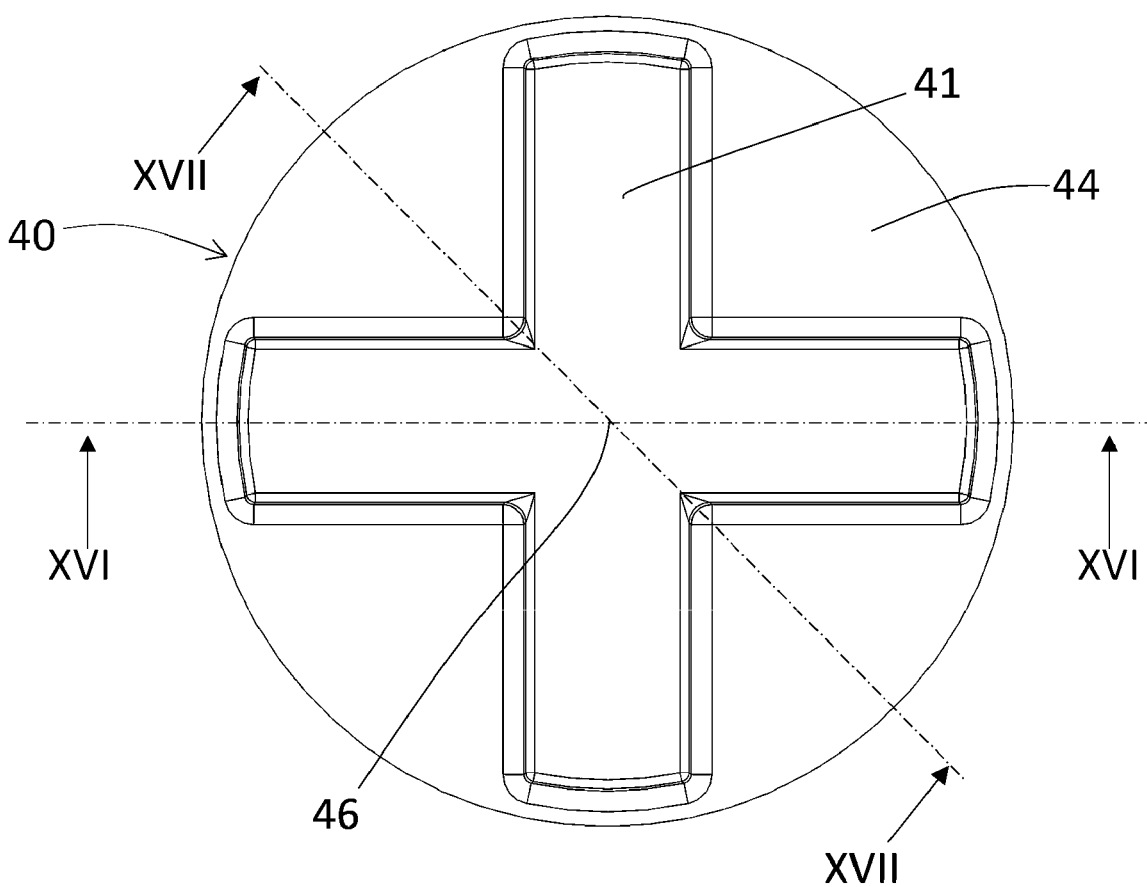
Figure 16:
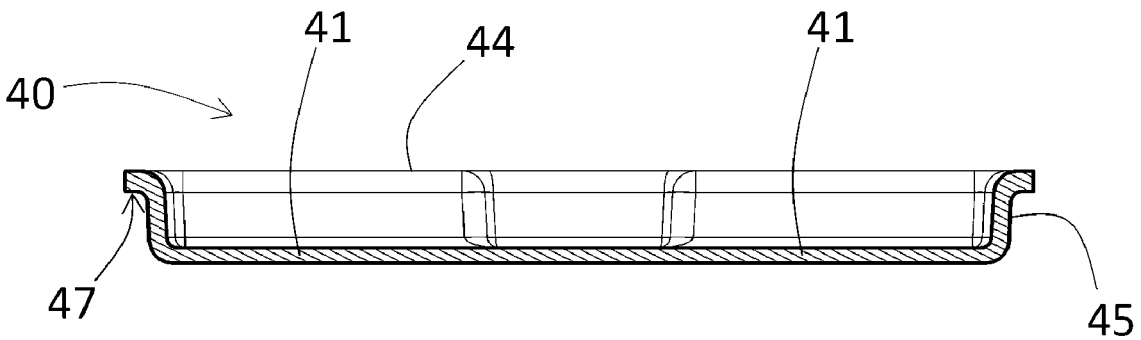
FIG. 16 is a cross-sectional view taken along line XVI-XVI of FIG. 15.
Figure 17:
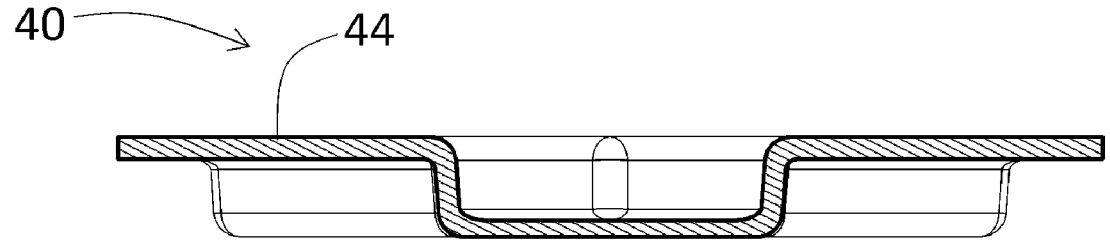
FIG. 17 is a cross-sectional view taken along line XVII-XVII of FIG. 15.

The electrode connecting portions 41 are provided as a plurality of protrusions protruding downwardly into the interior of the battery can 10 along the axial direction. In the present embodiment illustrated in FIGS. 13 to 18, four electrode connecting portions 41 are radially formed by being elongated linearly along a respective radial direction. Such electrode connecting portions 41 are preferably equally spaced at equal intervals in the circumferential direction about a center 46 of the cap 40. In the case of four of such electrode connecting portions 41, the spacing may be at 90 degree intervals. Moreover, the electrode connecting portions 41 may be joined to one another in a radially central region of the cap 40, such that the central region of the cap 40 likewise defines a protrusion protruding downwardly into the interior of the battery can 11 along the axial direction. Such central protrusion may be formed to be at the same depth as the electrode connecting portions 41 and continuous with each of them. Thus, in the case of four equally spaced electrode connecting portions 41, such electrode connecting portions and the central protrusion joining them collectively define a cruciform shape as shown in FIGS. 13-15.

A welded portion W for bonding one or more of the electrode connecting portions 41 to the notched tabs 27 of the second electrode 22 of the electrode assembly 20 may have a linear shape formed along the radial direction to correspond to the extension direction of the respective electrode connecting portions 41. According to the present embodiment, the welded portion W having a linear, radially-oriented shape extending may be formed for each of the plurality of electrode connecting portions 41.

The cap 40 provides outermost surfaces 44 which are surfaces that would come into contact with the floor when the battery can 10 is placed upright so that the cap 40 of the battery can 10 faces the floor. Each outermost surface 44 is provided at a position higher (i.e., farther away from the interior of the battery can 10 along the axial direction) than the electrode connecting portions 41 and is disposed between two adjacent electrode connecting portions 41 in the circumferential direction.

Thus, in a state in which the electrode connecting portions 41 are in close contact with the notched tabs 27 by pressing the outermost surfaces 44 in the axial direction using a jig, the electrode connecting portions 41 and the notched tabs 27 can be welded together by irradiating surfaces of the electrode connecting portions 41 with a laser. Then, since the pressure of the jig presses the electrode connecting portions 41 against the notched tabs 27 on opposing sides of the welding line, the welding may be reliably performed.

A pair of electrode connecting portions 41 on opposing sides of the center 46 of the cap 40 have a shape in which the pair of electrode connecting portions 41 are disposed along a straight line passing through the center 46 of the cap 40. Therefore, when a welding line is formed, the welding line for two of the electrode connecting portions 41 aligned along a line may be formed with only a single movement of a laser welder. When first, second, third, and fourth electrode connecting portions are sequentially disposed along a circumferential direction of the cap 40 of the first embodiment, the first and third electrode connecting portions may be welded at one time, and the second and fourth electrode connecting portions may be welded at one time.

In addition, according to the present embodiment, when the outermost surfaces 44 between the first and third electrode connecting portions are pressed using a jig, since the secondary moment of inertia constituted by the recessed shapes of the second and fourth electrode connecting portions is large, the cap 40 may behave as a rigid body without twisting or bending despite the pressure of the jig. Indeed, it is believed that strength and rigidity of the cap 40 may be increased particularly efficiently, without adding material and weight, by having at least two electrode connecting portions 41 positioned on opposing sides of the center 46 of the cap 40 from one another. In that regard, without being limited to a particular theory of operation, it is believed that arranging such electrode connecting portions 41 along a straight line extending through the center 46 of the cap, particularly where such electrode connecting portions are elongated along that line (and may even extend from the central region to opposing sides of the cap 40), as such an arrangement will define a portion of the cap structure analogous to a stiffening beam extending across the cap. Furthermore, having four electrode connecting portions 41 equally spaced about the center 46, so as to extend along two straight lines that are orthogonal to one another, is believed to even further strengthen the cap, similar to perpendicular beams having a moment-resisting connection between them.

As described above, the four electrode connecting portions 41 are formed in the present embodiment so that all four of the electrode connecting portions 41 may be welded via two laser scan trajectories.

When the number of the electrode connecting portions 41 is excessively processed, there is a concern that the strength of the cap 40 may be weakened. In addition, when only two or three electrode connecting portions 41 are formed, it is difficult to create a cross section that provides a sufficient secondary moment of inertia in the circumferential direction.

As in the present embodiment, when the four electrode connecting portions 41 are formed in a cruciform or "+" shape in the cap 40, the welding process may be performed accurately and conveniently, increased torsion resistance and bending resistance of the cap 40 may be provided, and the weakening of the strength of the cap 40 due to a pressing process may also be reduced or prevented. In addition, the cap may not only serve as the current collector plate but also maintain strength for its original function of closing the open end of the battery can 10.

Figure 18:
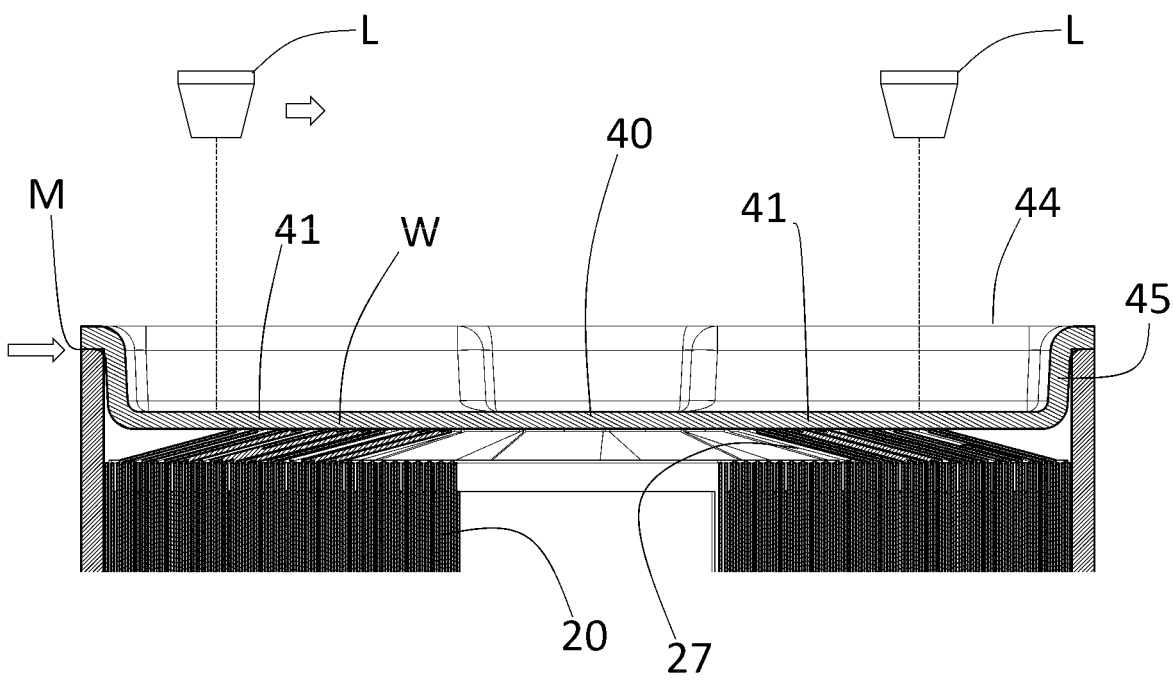
FIG. 18 is a cross-sectional diagram illustrating a process of assembling the battery can utilizing the cap according to the first embodiment.
Figure 19:
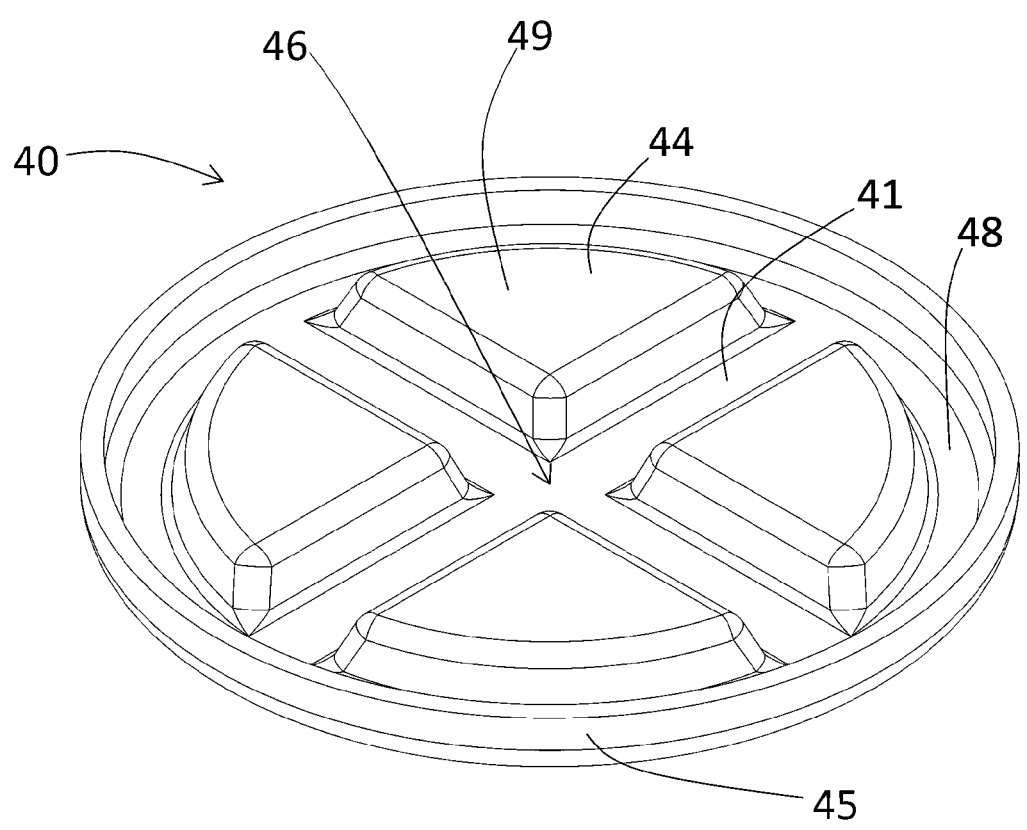
FIGS. 19 to 21 are a top perspective view, a bottom perspective view, and a plan view, respectively, illustrating a cap according to a second embodiment.
Figure 20:
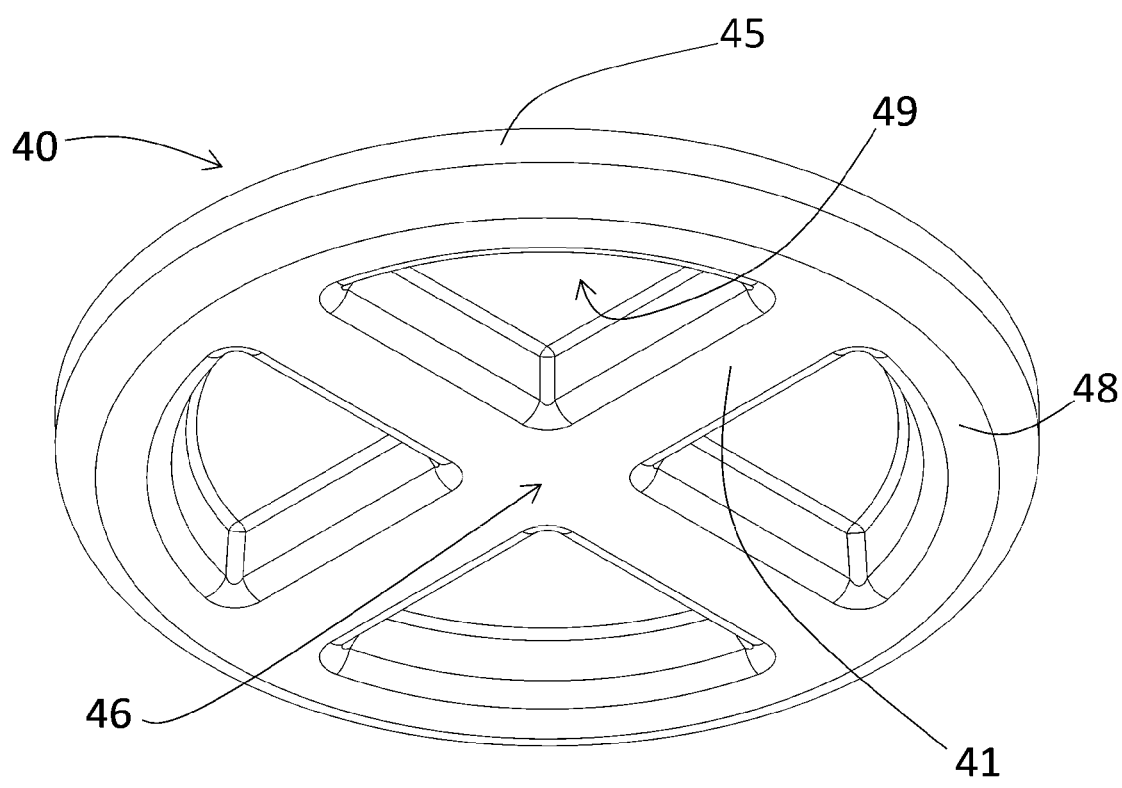
Figure 21:
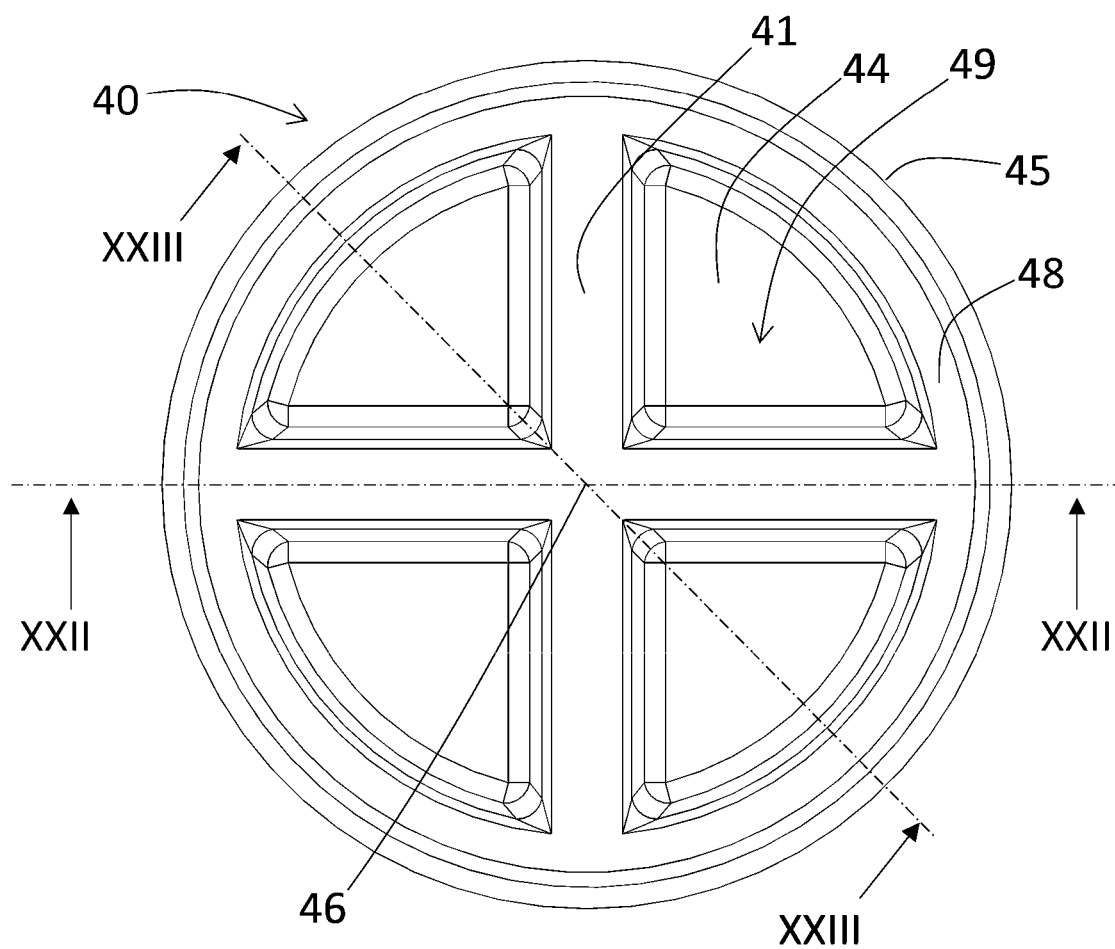
Figure 22:
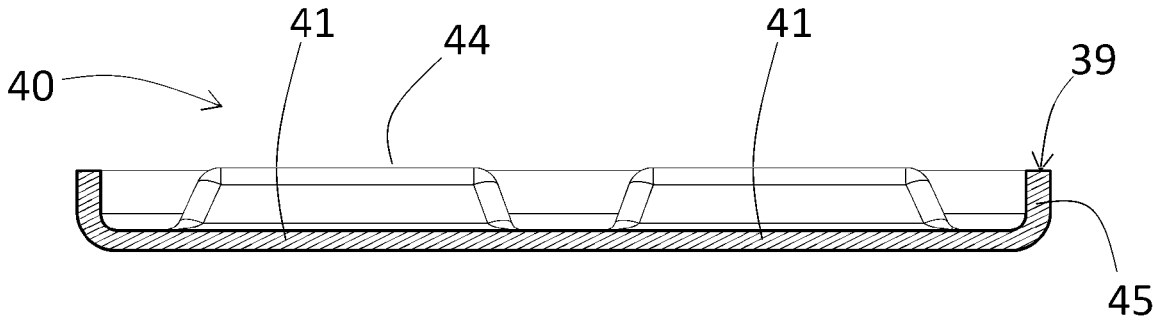
FIG. 22 is a cross-sectional view taken along line XXII-XXII of FIG. 21.
Figure 23:
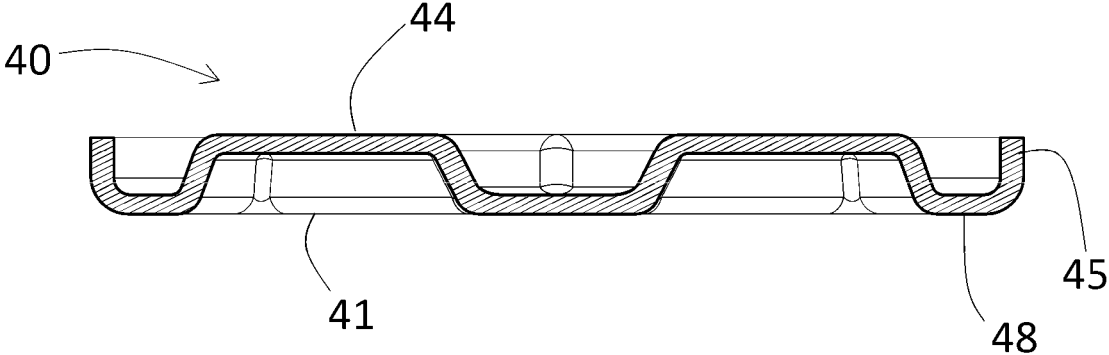
FIG. 23 is a cross-sectional view taken along line XXIII-XXIII of FIG. 21.

A radially outer perimeter of the cap 40 has a shape configured to be bonded to an axial end portion of the side wall 11 at the open end of the battery can 10. To that end, the electrode connecting portions 41 may be formed to be spaced radially inwardly from the outer perimeter of the cap such that a lower surface of the cap 40 along the radially outer perimeter defines an abutment surface 47 having a circular profile extending about the center 46 of the cap 40. As shown in FIG. 18, that abutment surface 47 of the cap 40 may be contact with an axial end surface along the edge of the side wall 11 at the open end of the battery can 10, and those contacting surfaces may be welded together by a laser directed radially inwardly along the outer circumference of the battery can 10 so as to form bonded portion M.

The radially outer sides of the electrode connecting portions 41 may define a press-fitting outer wall 45 having an outer diameter corresponding to an inner diameter of the battery can 10. Thus, when the cap 40 is assembled to the battery can 10, the press-fitting outer walls 45 of the plurality of electrode connecting portions 41 are each brought into contact with and press-fitted while sliding against the inner circumferential surface of the battery can 10, so as to guide the alignment of the cap 40 with respect to the battery can 10.

According to the first embodiment, the four press-fitting outer walls 45 are equally distributed in the circumferential direction and are brought into contact with the battery can 10 over portions of the entire circumference of the inner circumferential surface. Thus, the cap 40 may be relatively easily press-fitted into the battery can 10.

As described above, the cap 40 of the present embodiment has an advantage of being easily assembled because the press-fitting outer walls 45 are pressed together when the electrode connectors 41 are pressed.

In addition, according to the structure of the cap 40 in this embodiment, since the laser for welding the cap 40 to the battery can 10 is oriented in the radial direction, if it turns out that the abutment surface 47 of the cap 40 is not in close contact with the axial end surface of the side wall 11 in one or more areas, the laser would not be oriented such that it would damage the electrode assembly 20 positioned inside of the battery can 10.

According to the first embodiment, since the outermost surfaces 44 of the cap 40 are positioned further outwardly along the axial direction than the bonded portion M, even when the battery can 10 of FIG. 18 is turned upside down and stands upright. Thus, the bonded portion M does not directly touch the floor, such that the bonded portion M is more easily protected.

When the above-described cap 40 is utilized, there is no need to use a current collector plate to electrically connect the tab of the second electrode 22 to the battery can 10. Thus the number of parts and assembly man-hours may be reduced, and a larger internal volume may result, thereby increasing energy density. Since the cap 40 electrically connected to the battery can 10 is directly connected to the metal foil 23 of the second electrode of the electrode assembly 20 via the welded portions W extending in the radial direction, current paths are preferably evenly distributed so that internal resistance may also be significantly reduced.

SECOND EMBODIMENT

Hereinafter, with reference to FIGS. 19 to 24, a second embodiment of a cap and a structure of a battery cell in which the cap is utilized will be described. In describing the second embodiment, the overlapping content with the above-described first embodiment will be omitted. Therefore, contents not described in one embodiment will be understood from other embodiments. In addition, it can be easily understood that components of one embodiment can replace or be added to components of other embodiments, or omitted.

The cap of the second embodiment is different from the cap of the first embodiment in that a protruding portion in the form of an annular protrusion 48 extends along a radially outer perimeter region of the cap 40, the annular protrusion 48 protruding downwardly into the interior of the battery can 10 along the axial direction. The annular protrusion 48 connects the various electrode connecting portions 41. The radially outer perimeter of the cap 40 is defined by a radially outer perimeter of the annular protrusion 48, which outer perimeter is configured to be positioned within the inner diameter of the side wall 11 of the battery can 10. The radially outer perimeter thus constitutes a press-fitting outer wall 45.

The annular protrusion 48 may be formed at the same time that the one or more electrode connecting portions 41 are formed. Outermost surfaces 44 of the cap 40 may be located radially inwardly of the annular protrusion 48 on intermediate regions 49 of the cap 40 defined between the circumferentially spaced apart electrode connecting portions 41, and the cap 40 may have a shape in which a bottom of the annular protrusion 48 is connected to a bottom of the electrode connecting portions 41. That is, the outermost surfaces 44 are located on intermediate regions 49 of the cap 40 positioned between the electrode connecting portions 41 in the circumferential direction and positioned inwardly of the annular protrusion 48 in the radial direction.

Figure 24:
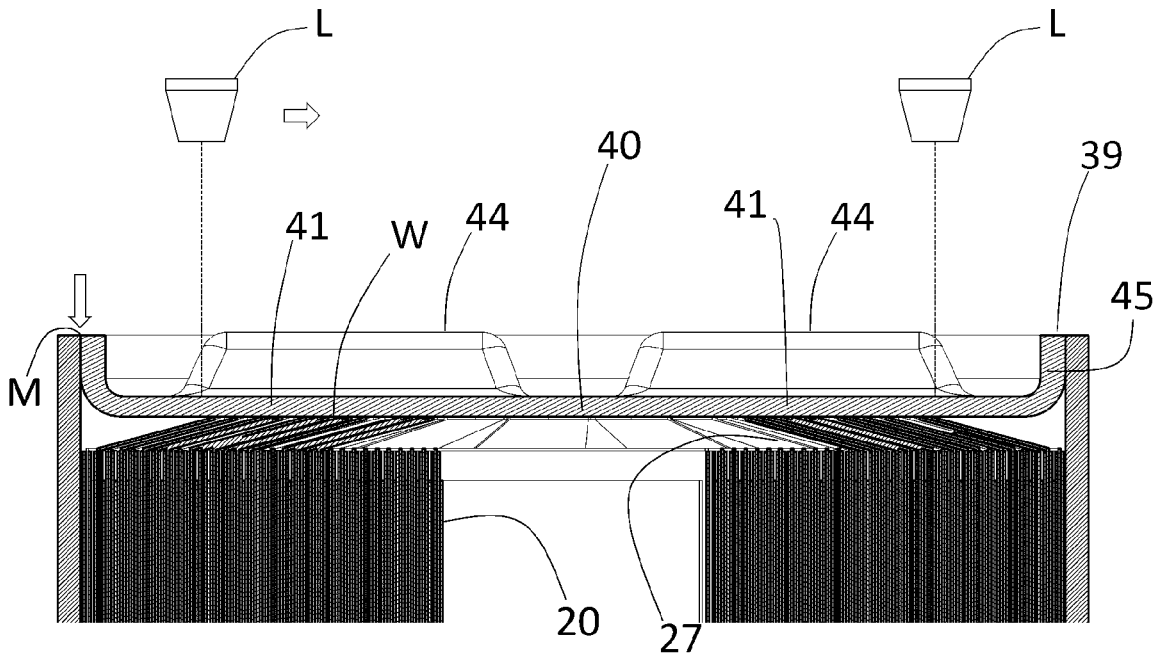
FIG. 24 is a cross-sectional diagram illustrating a process of assembling the battery can utilizing the cap according to the second embodiment.
Figure 25:
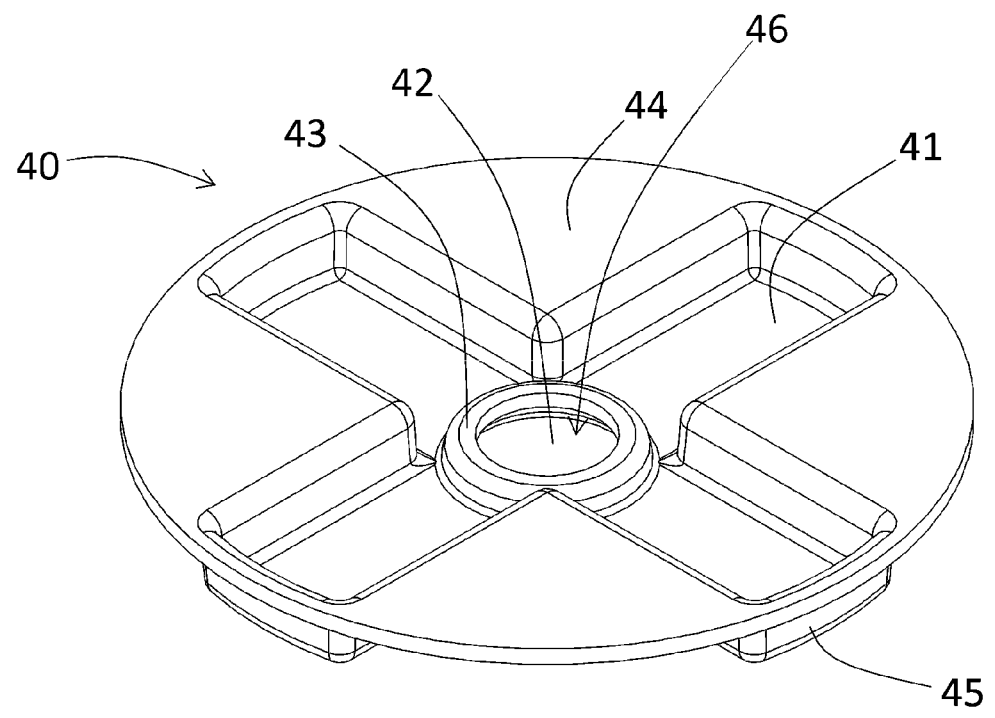
FIGS. 25 and 26 are a top perspective view and a plan view, respectively, illustrating a cap according to a third embodiment.
Figure 26:
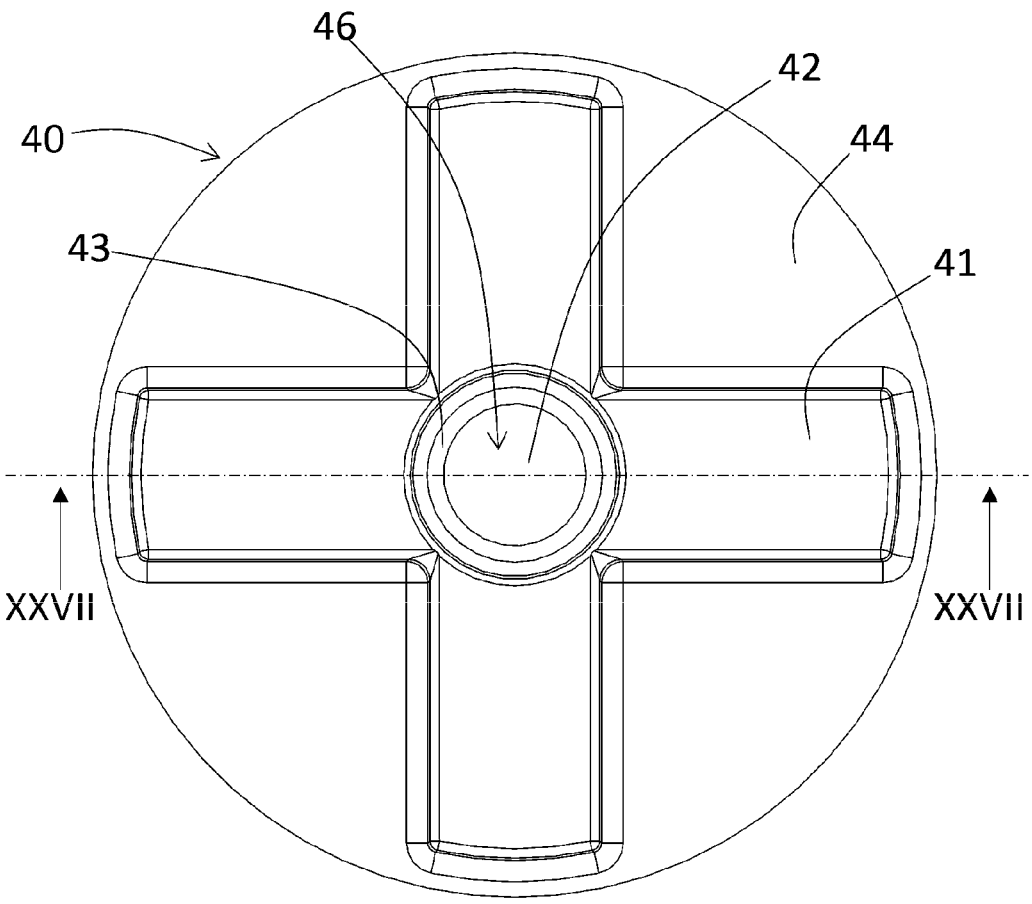
Figure 27:
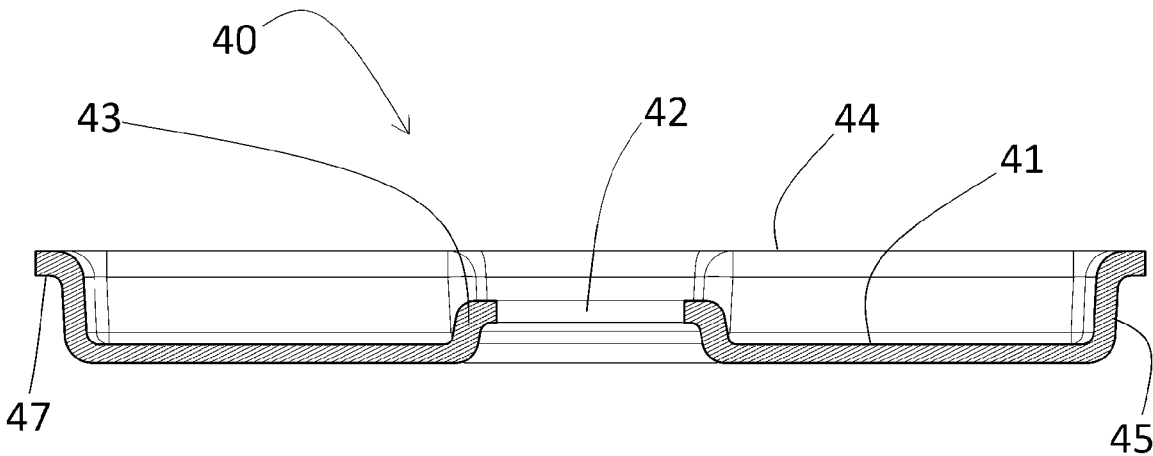
FIG. 27 is a cross-sectional view taken along line XXVII-XXVII of FIG. 26.
Figure 28:
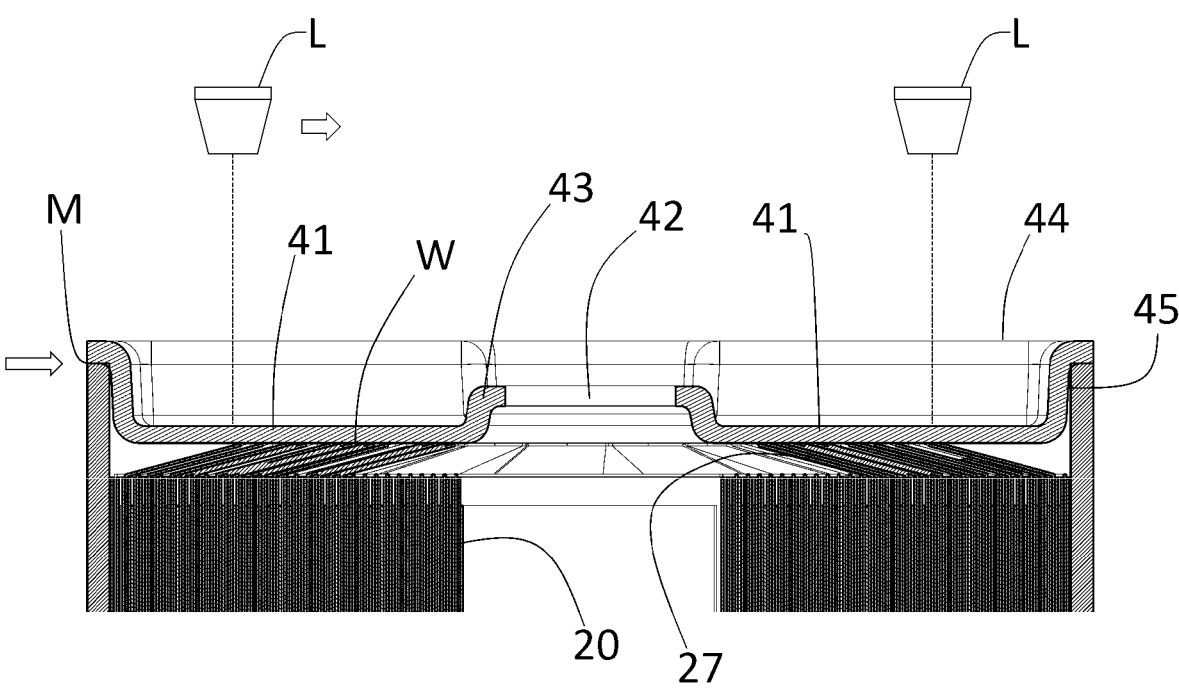
FIGS. 28 and 29 are cross-sectional diagrams illustrating a process of assembling the battery can utilizing the cap according to the third embodiment.
Figure 29:
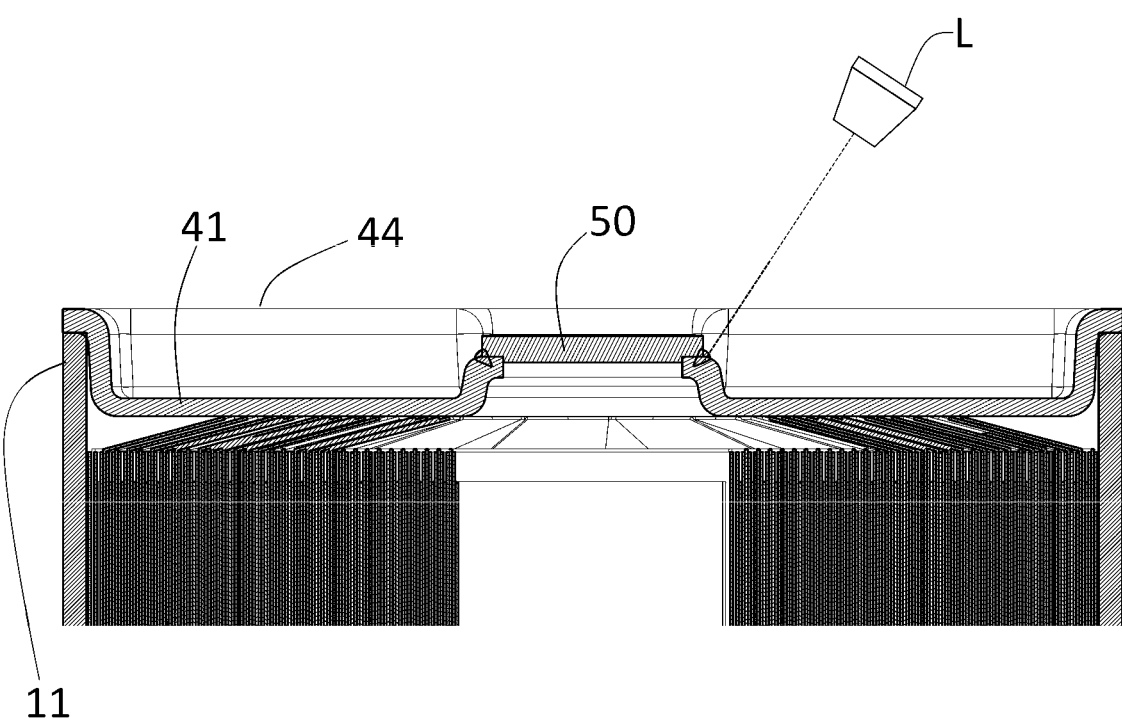

Unlike the first embodiment, as shown in FIG. 24, in the cap 40 of the second embodiment, an outer perimeter of the press-fitting outer wall 45 may be brought into contact with an inner circumferential surface of the battery can 10 and may be press-fitted into the battery can 10. The press-fitting outer wall 45 does not limit a press-fitted depth of the cap 40 which is press-fitted in the axial direction. In the second embodiment, the press-fitted depth of the cap 40 may be limited by the electrode connecting portions 41. That is, the cap 40 may be press-fitted to a position where the bottom of the electrode connecting portions 41 come into close contact with the notched tabs 27 of the electrode assembly 20.

In the above state, the electrode connecting portions 41 and the notched tabs 27 are welded in the length direction of the electrode connecting portions, that is, in the radial direction, to form welded portions W, and an upper end portion of the outer circumferential surface of the press-fitting outer wall 45 and an upper end portion of a side wall 11 of the battery can 10 are welded to form the bonded portions M.

The outermost surfaces 44 are located axially above an axial end portion 39 of the press-fitting outer wall 45. That is, a height of the outermost surfaces 44 is higher than a height of the press-fitting outer wall 45. Therefore, in a state in which the bonded portions M are formed on the press-fitting outer wall 45 and the side wall 11, even when the battery can 10 is erected to allow the cap 40 to touch the floor, the bonded portions M do not directly receive a load from the floor so that the bonded portions M may be protected.

In addition, since the outermost surfaces 44 touches the floor to receive a load, and the load is applied in an axial direction in which the electrode connecting portions 41 and the tab of the second electrode 22 are pressed together, the welded portions W between the cap 40 and the notched tabs 27 are also protected.

Since the cap 40 of the second embodiment has a cross section having a high secondary moment of inertia in the circumferential direction of the edge, distortion resistance and bending resistance are higher.

THIRD EMBODIMENT

Hereinafter, with reference to FIGS. 25 to 30, a third embodiment of a cap and a structure of a battery cell in which the cap is utilized will be described.

When compared to the first embodiment, a cap 40 of the third embodiment further includes a liquid inlet 42 provided at a central portion of the cap 40. The liquid inlet 42 may be aligned with a hollow of a winding center of the electrode assembly 20.

The liquid inlet 42 may be provided on a central protruding region of the cap such as circular protrusion 43 protruding slightly upward from the electrode connecting portions 41 of the cap 40. A height of the protrusion 43 is set to be lower than a height of the outermost surfaces 44. In a state in which the liquid inlet 42 is covered and closed with a stopper 50 (which will be described below), a height of the stopper 50 may also be lower than the height of the outermost surfaces 44.

Since the protrusion 43 protrudes upwardly so as to be higher than the bottom of the cap 40, when an electrolyte is injected through the liquid inlet 42 and then the liquid inlet 42 is covered with a stopper 50 and bonded by welding, the heat for bonding is preferably not transferred to the electrode assembly 20, thus reducing the risk of damaging a separator.

The caps 40 of the above-described first and second embodiments are not provided with a separate liquid inlet. Thus, when the caps 40 are positioned on the battery cans 10 during manufacturing of those earlier embodiments, the electrolyte injection process may be performed first, before covering the battery can 10 with the cap 40, since there is no separate liquid inlet in the battery can 10.

However, when the liquid inlet 42 is provided in the cap 40, as in the third embodiment, the electrolyte may be injected through the liquid inlet 42 even after the cap 40 is assembled onto the battery can 10 and the welded portions W and bonded portions M are formed. Then, when compared to the bonding of the cap 40 to the battery can 10 in a state in which the electrolyte is already injected, the third embodiment having the liquid inlet 42 is likely to beneficially lead to a reduction of any heat effects to the electrolyte caused by the bonding. In addition, even when the stopper 50 is bonded to a circumference of the liquid inlet 42, since the protrusion 43 protrudes upward away from the interior of the battery can, the likelihood of the bonding heat applied to the stopper 50 affecting the electrolyte should also be reduced.

Since the stopper 50 is also positioned to be lower than the outermost surfaces 44, even when the battery cell is erected with the cap 40 touching the floor, the stopper 50 does not directly receive a load.

Figure 30:
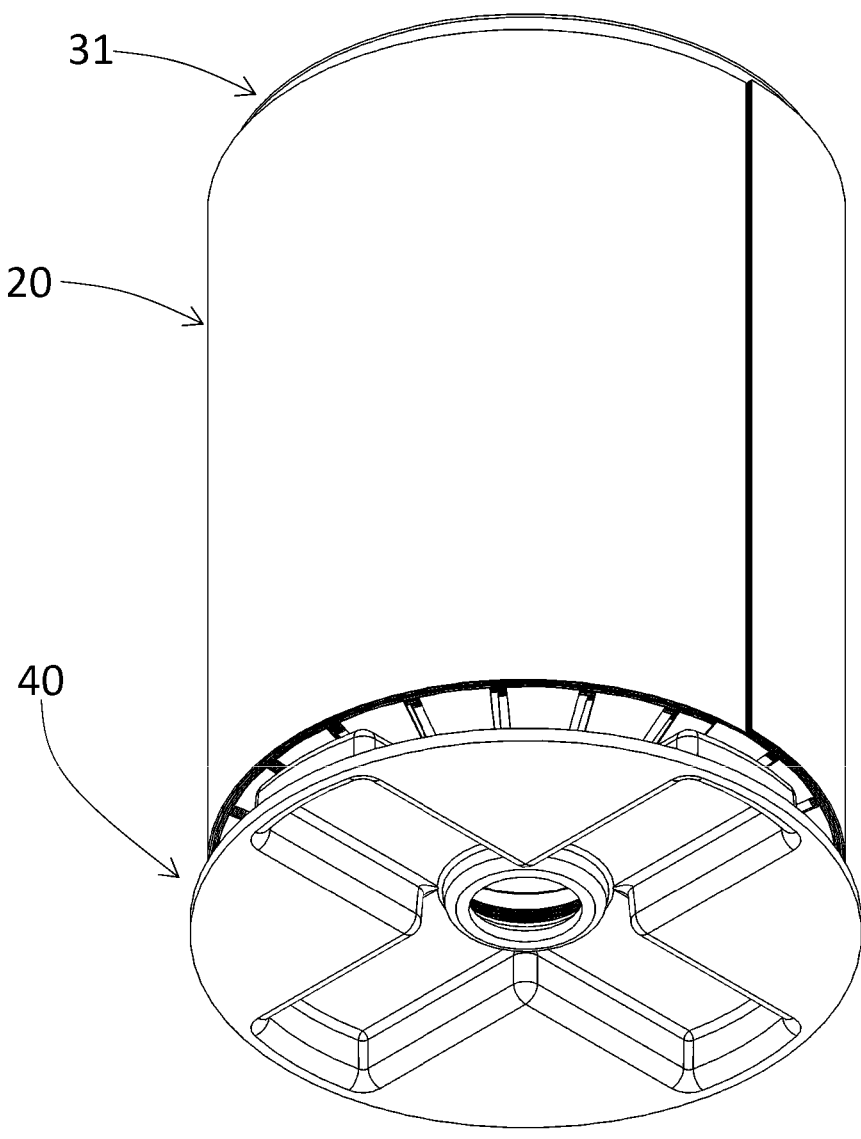
FIG. 30 is a perspective view illustrating a state in which the tab of the second electrode of the electrode assembly and the cap are bonded first before the electrode assembly is accommodated in the battery can.
Figure 31:
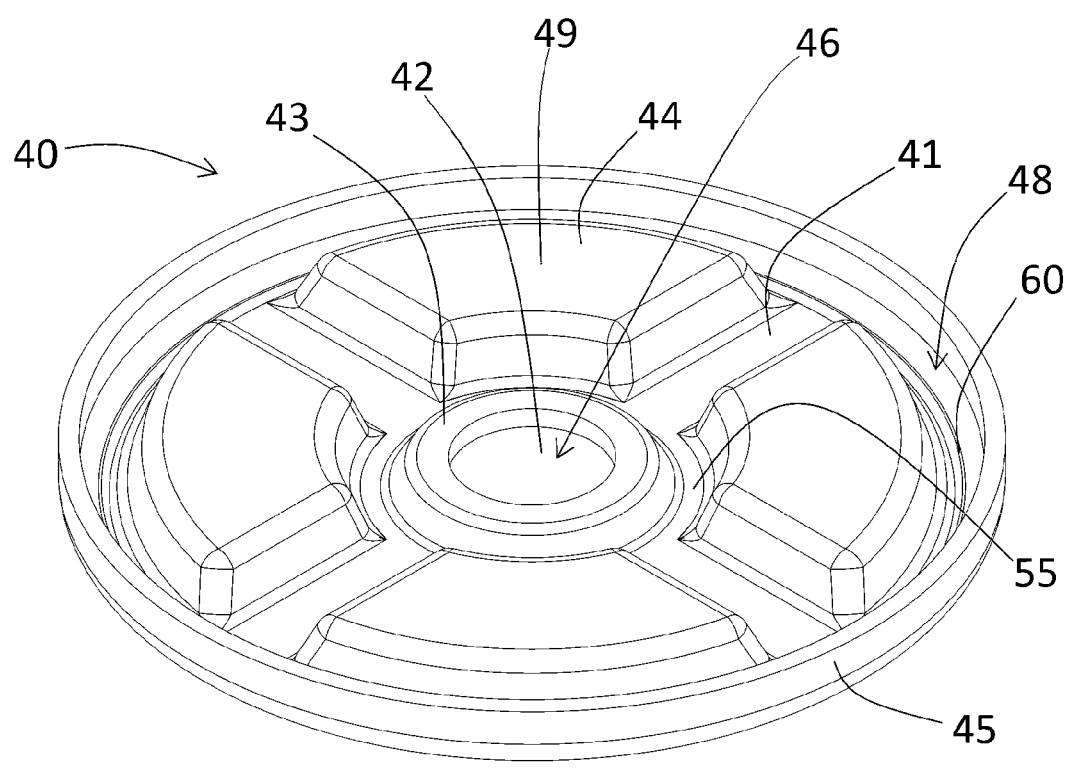
FIGS. 31 and 32 are a top perspective view and a plan view, respectively, illustrating a cap according to a fourth embodiment.

On the other hand, the liquid inlet 42 formed in the central portion of the cap may be a passage through which equipment may enter and exit for welding a first electrode terminal 13 to a current collector plate 31 of the first electrode 21. Accordingly, as shown in FIG. 30, the cap 40 may first be attached to the battery can 10 in a state of already being connected to the tabs of the second electrode 22 of the electrode assembly 20. That is, as shown in FIG.

30, the electrode assembly 20 may be accommodated in the battery can 10 in a state in which the current collector plate 31 is bonded to the tab of the first electrode 21 of the electrode assembly 20 and the cap 40 is bonded to the tab of the second electrode 22. In addition, the process of welding the current collector plate 31 to the first electrode terminal 13 may be performed through the liquid inlet 42 of the cap 40 and the hollow of the winding center of the electrode assembly 20.

FOURTH EMBODIMENT

Hereinafter, with reference to FIGS. 31 to 35, a fourth embodiment of a cap and a structure of a battery cell in which the cap is utilized will be described.

Similar to the relationship of the third embodiment to the first embodiment, a liquid inlet 42 is further provided in a central portion of a cap 40 of the fourth embodiment compared to the second embodiment. In addition, compared to the second embodiment, the cap of the fourth embodiment has a shape in which the radially inner side of the intermediate regions 49 of the cap 40 are spaced radially outwardly away from the protrusion 43 by an annular portion 55 of the cap 40. Accordingly, both radially inner and outer sides of the intermediate regions 49 may have an arcuate shape.

A vent 60 in the form of a weak or thin portion is positioned along a bottom of the annular protrusion 48 of the cap 40. The vent 60 may be formed by creating a notch in either or both of the upper surface and the lower surface of the annular protrusion 48. The vent 60 is positioned radially outside each of electrode connecting portions 41, where it may extend around them along the circumferential direction.

The vent 60 is preferably sufficiently strong so as to not be deformed by any forces applied when the cap 40 is press-fitted into the battery can 10. On the other hand, when an internal pressure rapidly increases due to a short circuit occurring in the battery can 10, the vent 60 becomes broken so as to separate the electrode connecting portions 41 of the cap 40 from the press-fitting outer wall 45 thereof. Thus, an electrical connection between the battery can 10 and the electrode connecting portions 41, which are connected to the tabs of the second electrode 22, becomes disconnected, while also opening an internal space of the battery can 10 the outside so as to discharge the gas causing the internal pressure.

In addition, the vent 60 is provided radially outside the intermediate regions 49 of the cap 40 on which the outermost surfaces 44 are positioned. In addition, as discussed above, the outermost surfaces 44 are positioned on intermediate regions 49 of the cap 40 positioned between the electrode connecting portions 41 in the circumferential direction.

Thus, when the internal pressure of the battery can 10 increases, the internal pressure is applied to the underside of the cap 40 so as to forcibly move the portion of the cap 40 positioned radially inwardly of the vent 60 upward. The action of that force occurs intensively in four places in the circumferential direction (i.e., on the undersides of the intermediate regions 49 of the cap 40 circumferentially between the electrode connecting portions 41). Therefore, the internal pressure of the battery can may be smoothly transferred to the vent 60 to induce smooth breakage of the vent 60.

In the fourth embodiment, the vent 60 is disposed radially inwardly of the press-fitting outer wall 45 of the cap 40 and disposed radially outwardly of the electrode connecting portions 41 and the intermediate regions 49 therebetween.

However, the vent 60 formed in the cap 40 is not limited thereto. For example, the vent may be provided in a stopper 50 covering the liquid inlet 42, may be formed in a bonded portion between the liquid inlet 42 and the stopper 50, or may be formed by a bonded portion M between the cap 40 and the battery can 10. That is, according to the present embodiment, by implementing a vent structure in the cap 40 or in the bonded portion between the cap 40 and other parts, it is possible to avoid providing a separate volume for the vent structure. Therefore, the energy density of the battery cell can be further increased.

FIFTH EMBODIMENT

Figure 36:
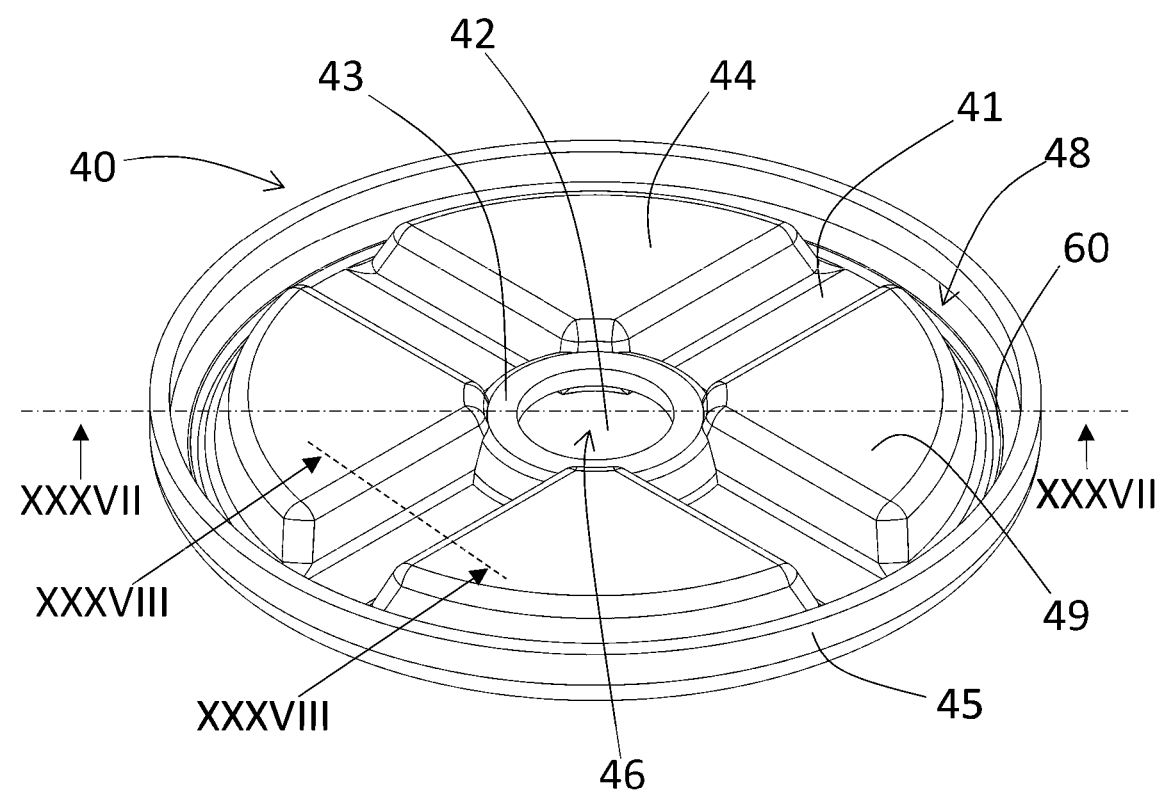
FIG. 36 is a top perspective view illustrating a cap according to a fifth embodiment.
Figure 37:
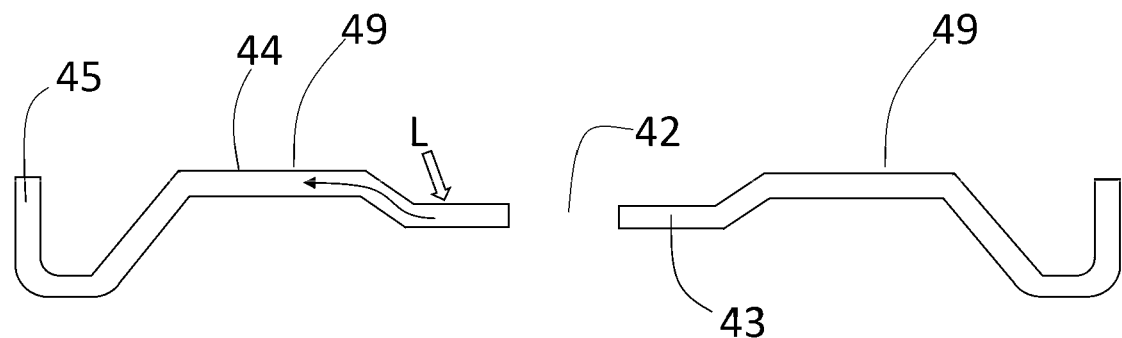
FIG. 37 is a cross-sectional view taken along line XXXVII-XXXVII of FIG. 36.

Hereinafter, with reference to FIGS. 36 to 38, a fifth embodiment of a cap will be described.

The cap of the fifth embodiment differs from the fourth embodiment in that the protrusion 43 providing the liquid inlet 42 directly adjoins or is directly connected to the radially inner sides of the intermediate regions 49 that are positioned circumferentially between the electrode connecting portions 41.

Figure 32:
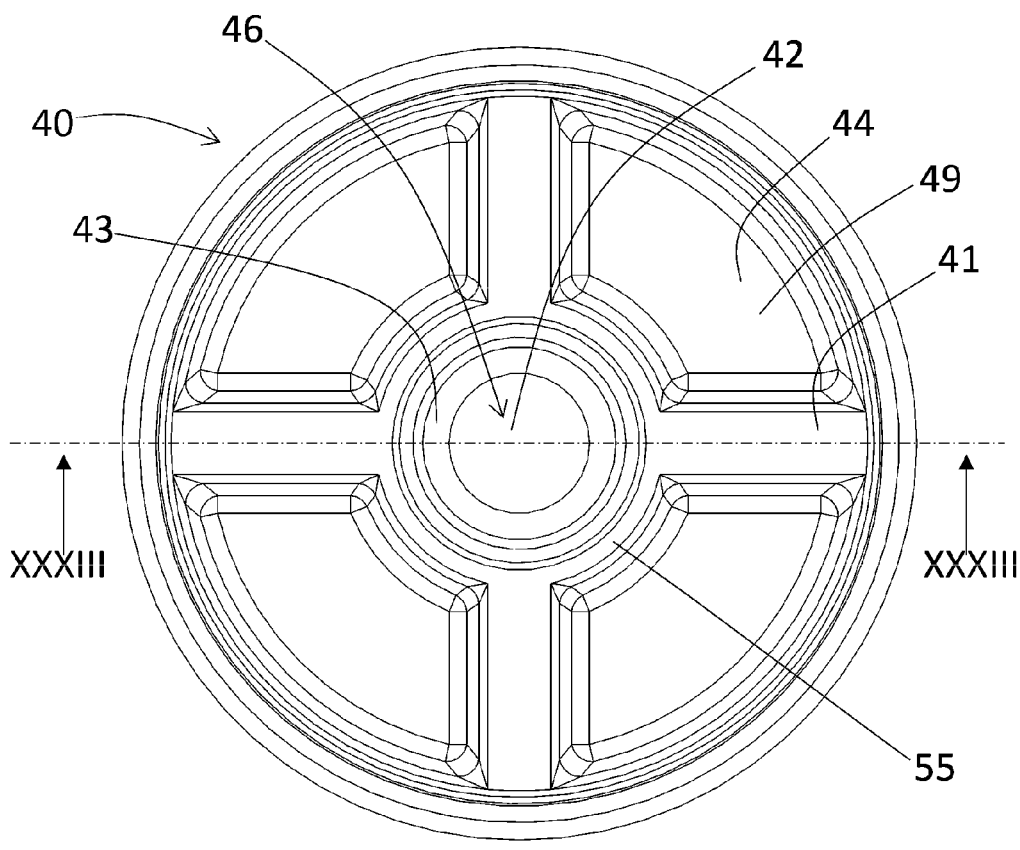
Figure 33:
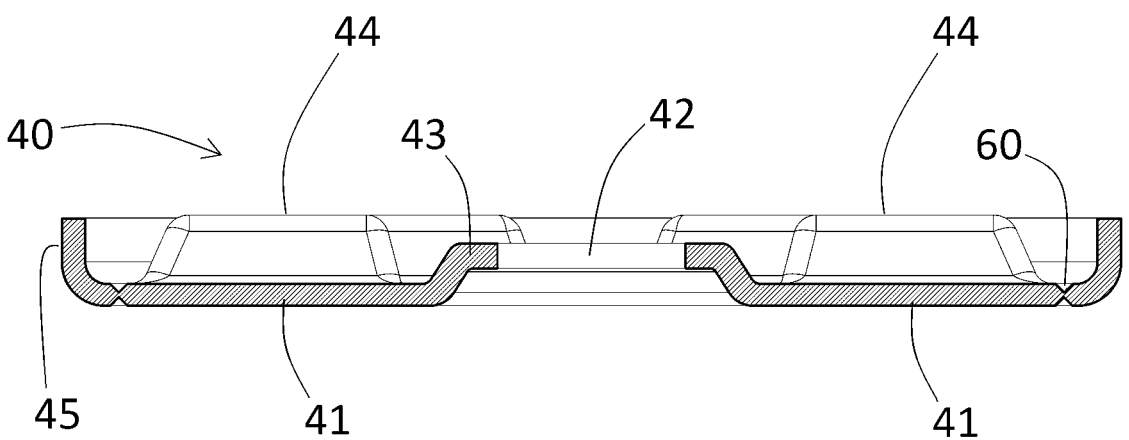
FIG. 33 is a cross-sectional view taken along line XXXIII-XXXIII of FIG. 32.
Figure 34:
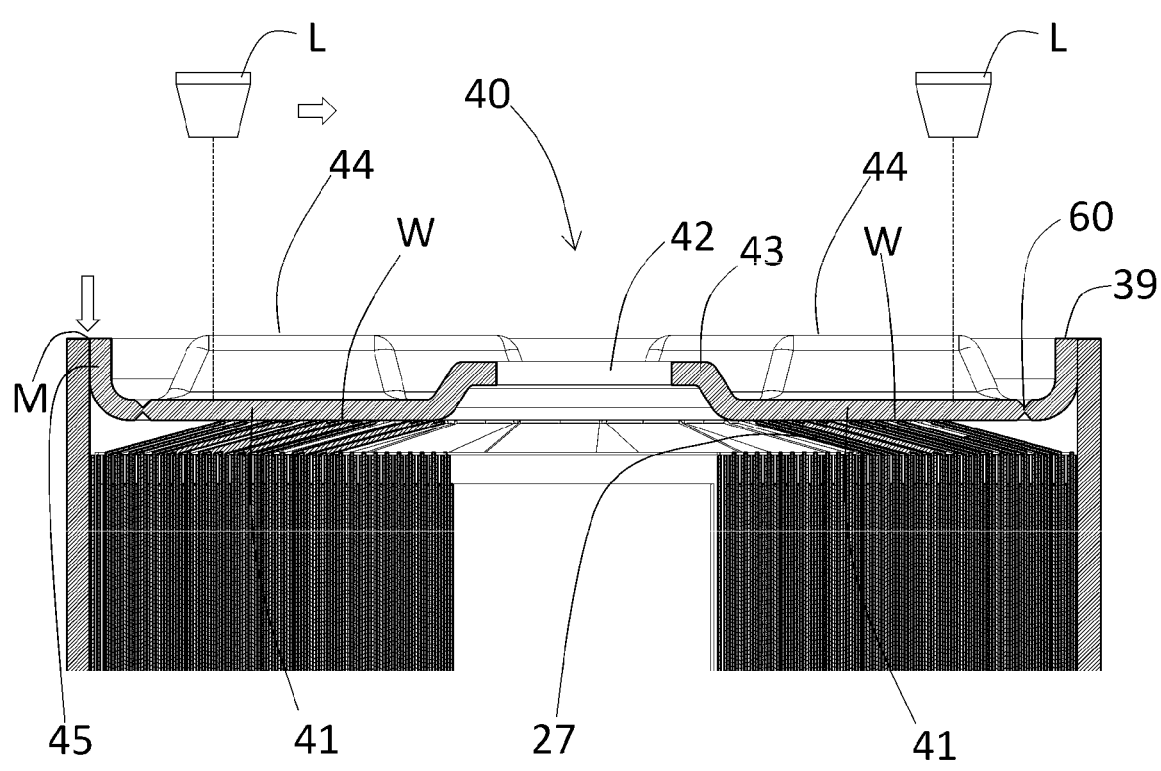
FIGS. 34 and 35 are cross-sectional diagrams illustrating a process of assembling the battery can utilizing the cap according to the fourth embodiment.
Figure 35:
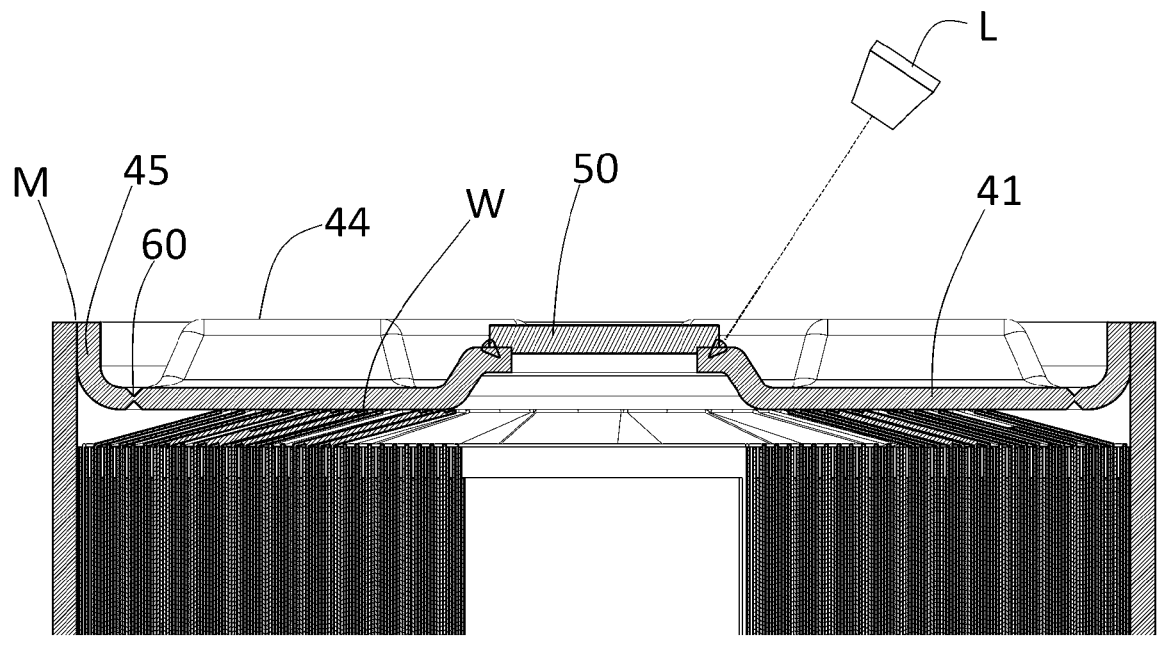

Referring to FIG. 32, in the cap of the fourth embodiment, the protrusion 43 is surrounded by the annular portion 55 of the cap 40 that spaces apart the protrusion 43 from the intermediate regions 49 in the radial direction. On the other hand, as shown in FIG. 37, in the cap 40 of the fifth embodiment, the protrusion 43 is directly connected to the intermediate regions 49 of the cap 40. Due to the above structure, when heat is generated during welding of the stopper 50 to close the liquid inlet 42, a heat conduction path is defined so as to directly transfer the heat to the intermediate regions 49 without being substantially conducted to the electrode assembly 20. Thus, any negative impact of the bonding heat on the electrode assembly 20 can be beneficially reduced.

Figure 38:
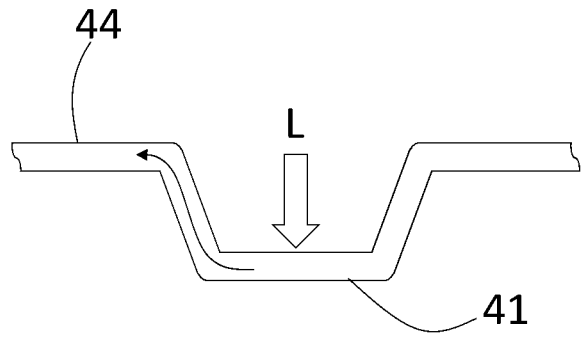
FIG. 38 is a cross-sectional view taken along line XXXVIII-XXXVIII of FIG. 36.

In addition, it is noted that in all of the above-described embodiments, as demonstrated in FIG. 38, since both sides of each electrode connecting portion 41 in the circumferential direction are adjacent to the intermediate regions 49, the heat generated when the electrode connecting regions 41 are welded to the tabs 27 of a second electrode 22 is dissipated through the outermost surfaces 44 of the intermediate regions 49. Thus, any negative impact of the bonding heat on the electrode assembly can be beneficially reduced.

Method of Manufacturing Battery Cell

Since the caps 40 of the above-described embodiments each have the natural function of a cap while simultaneously serving as a current collector plate for the second electrode, the method of manufacturing a battery cell differs from conventional methods of manufacturing a battery cell which involve a conventional current collector plate for the second electrode.

In addition, in embodiments of the invention in which the cap 40 includes the liquid inlet 42, the liquid inlet 42 may be used as a passage for the process of bonding the current collector plate 31 to the first electrode terminal 13, which can lead to more flexibility in the methods of manufacturing the battery cell.

Figure 39:
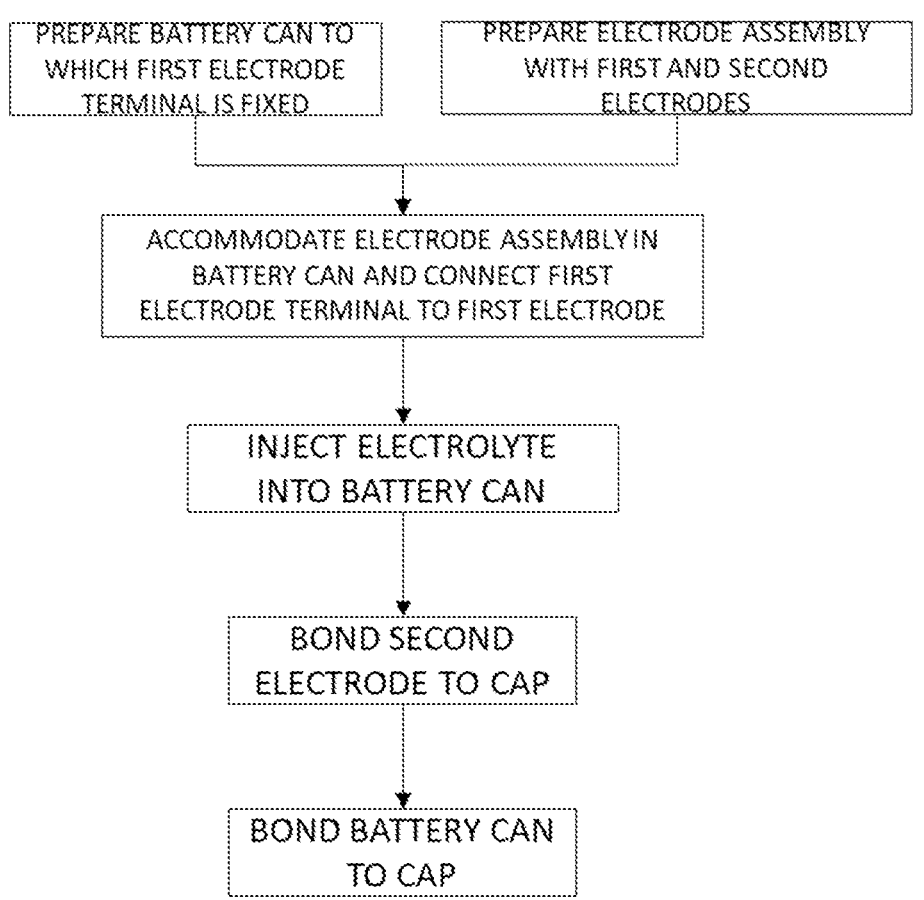
FIGS. 39 to 41 are flowcharts illustrating embodiments of methods of assembling a battery cell utilizing caps according to embodiments of the invention.

First, a manufacturing method will be described in connection with the flowchart of FIG. 39. Such manufacturing method may be used in a case in which the cap 40 does not include a liquid inlet 42.

The manufacturing method includes preparing the battery can 10 to which the first electrode terminal 13 is fixed, and preparing an electrode assembly with a first electrode and a second electrode. The first electrode and the current collector may be connected and bonded to one end of the electrode assembly in the axial direction.

Next, while the current collector faces the bottom 12 of the battery can 10, the electrode assembly 20 is inserted into the battery can 10 and the current collector plate 31 of the electrode assembly 20 is bonded (by welding or the like) to the first electrode terminal 13 fixed to the bottom 12 of the battery can 10.

Then, an electrolyte is injected into the battery can 10 through an open end of the battery can 10.

Subsequently, the open end of the battery can 10 is closed by covering it with the cap 40. In this case, bonding is performed while the electrode connecting portions 41 of the cap 40 are in close contact with the tab(s) of the second electrode 22 of the electrode assembly 20. Then, a circumference of the open end of the battery can 10 is bonded to the perimeter of the cap 40.

According to the above manufacturing method, a bonding process for a separate current collector plate for the second electrode 22 is not required.

Figure 40:
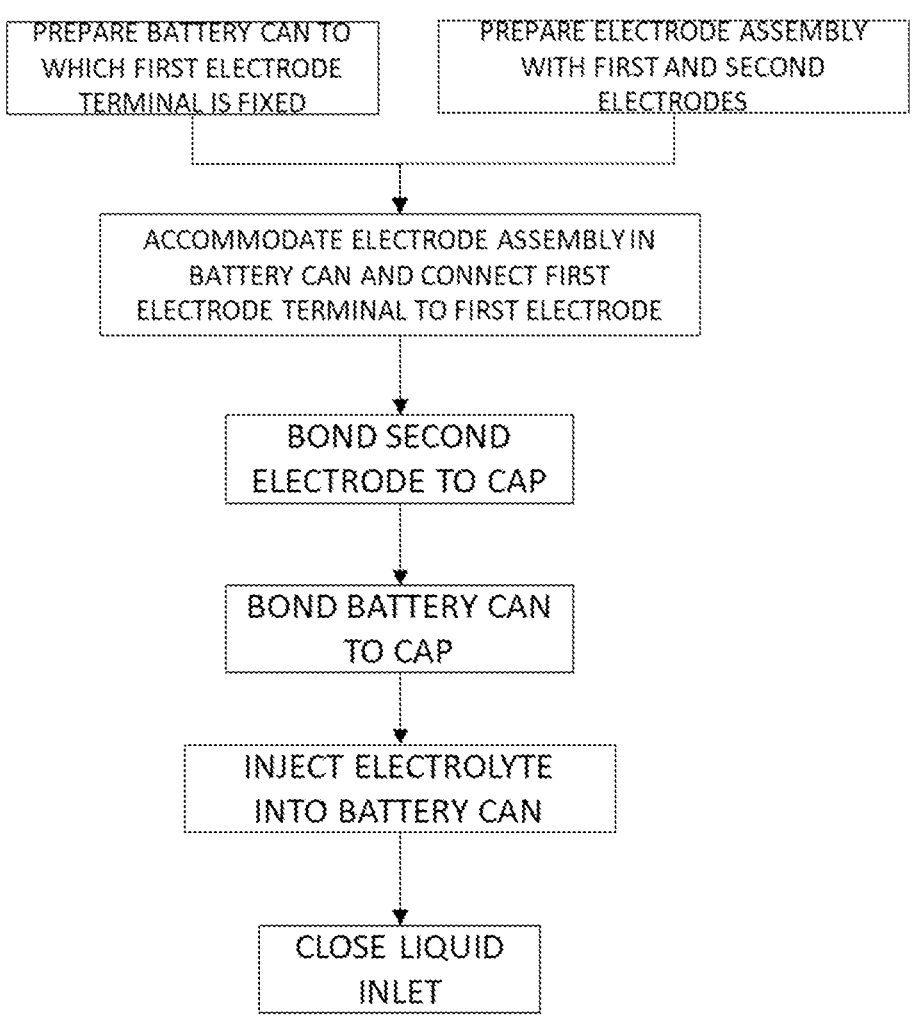

Next, another manufacturing method will be described in connection with the flowchart of FIG. 40. Such manufacturing method may be used in a case in which the cap 40 includes a liquid inlet 42.

The manufacturing method includes preparing the battery can 10 to which the first electrode terminal 13 is fixed, and preparing an electrode assembly with a first electrode and a second electrode. The first electrode and the current collector may be connected and bonded to one end of the electrode assembly in the axial direction.

Next, while the current collector faces the bottom 12 of the battery can 10, the electrode assembly 20 is inserted into the battery can 10 and the current collector plate 31 of the electrode assembly 20 is bonded (by welding or the like) to the first electrode terminal 13 fixed to the bottom 12 of the battery can 10.

Subsequently, the open end of the battery can 10 is closed by covering it with the cap 40. In this case, bonding is performed while the electrode connecting portions 41 of the cap 40 are in close contact with the tab(s) of the second electrode 22 of the electrode assembly 20. Then, a circumference of the open end of the battery can 10 is bonded to the perimeter of the cap 40.

Then, an electrolyte is injected into the battery can 10 through the liquid inlet, after which the liquid inlet is closed and sealed with the stopper 50.

According to the above manufacturing method, a bonding process for a separate current collector plate for the second electrode 22 is not required. Moreover, the bonding between the cap 40 and second electrode 22 and the bonding between the cap 40 and the battery can 10 may be performed before filling the inside of the battery can 10 with the electrolyte. As a result, it is possible to prevent the bonding heat from affecting the electrolyte.

Figure 41:
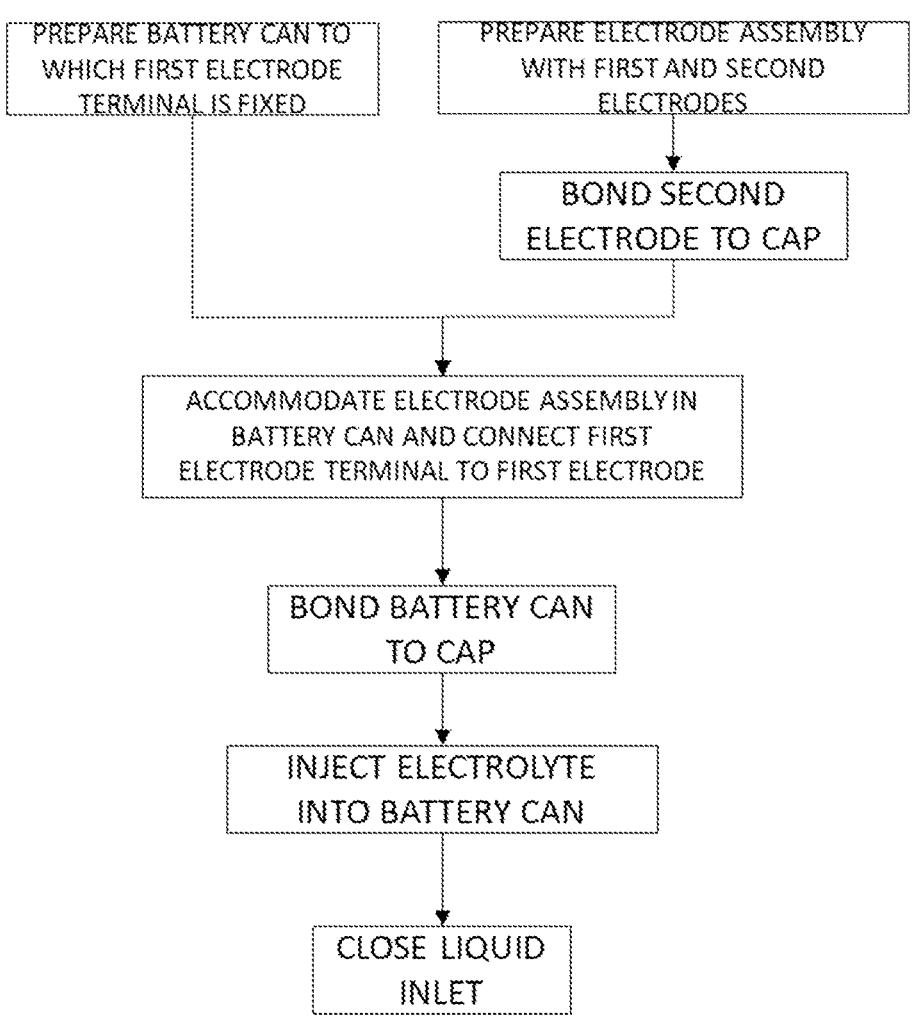

Next, another manufacturing method will be described in connection with the flowchart of FIG. 41. The manufacturing method may be applied to a case in which the cap 40 is provided with the liquid inlet 42.

The manufacturing method includes preparing the battery can 10 to which the first electrode terminal 13 is fixed, and preparing an electrode assembly with a first electrode and a second electrode. The first electrode and the current collector may be connected and bonded to one end of the electrode assembly in the axial direction. In addition, the electrode connecting portions 41 of the cap 40 and the tab(s) of the second electrode may be connected and bonded to the other axial end of the electrode assembly. That is, the cap may first be bonded to the second electrode of the electrode assembly before the electrode assembly is accommodated into the battery can.

Next, while the current collector faces the bottom 12 of the battery can 10, the electrode assembly 20 is inserted into the battery can 10. During the above process, the cap 40 is moved into a position covering the open end of the battery can 10.

Next, the current collector plate 31 of the electrode assembly 20 is bonded (by welding or the like) to the first electrode terminal 13 fixed to the bottom 12 of the battery can 10. The circumference of the open end of the battery can 10 is then bonded to the perimeter of the cap 40.

Then, an electrolyte is injected into the battery can 10 through the liquid inlet 42, after which the liquid inlet is closed and sealed with the stopper 50.

According to the above manufacturing method, a bonding process for a separate current collector plate for the second electrode 22 is not required. Moreover, the bonding between the cap 40 and second electrode 22 and the bonding between the cap 40 and the battery can 10 may be performed before filling the inside of the battery can 10 with the electrolyte. Thus, it is possible to prevent the bonding heat from affecting the electrolyte. Additionally, the cap 40 is first integrated into the electrode assembly 20 without separately managing the cap 40 so that assembly equipment can be further simplified.

Battery Pack and Vehicle

Figure 42:
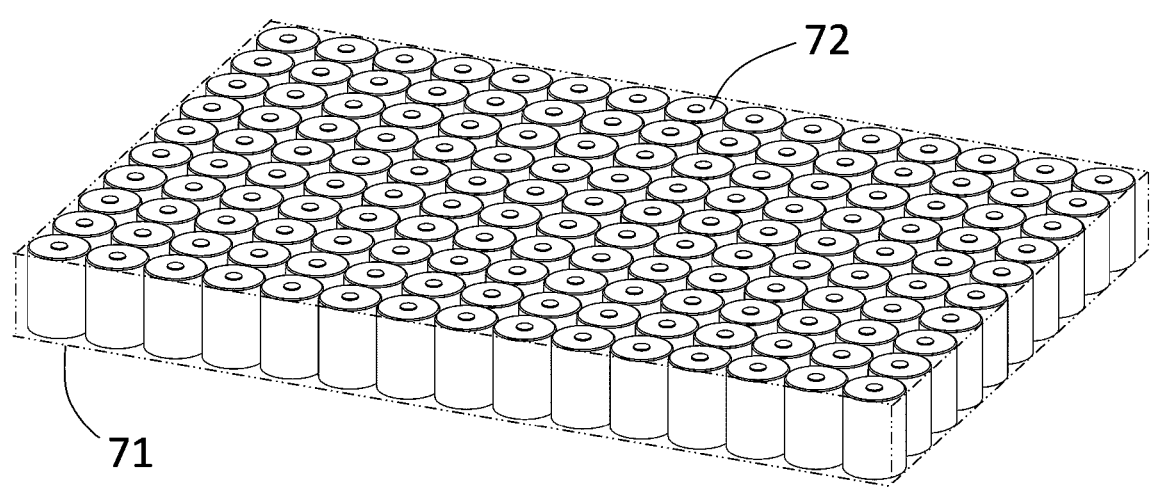
FIG. 42 is a perspective diagram illustrating a battery pack utilizing battery cells according to embodiments of the invention.

Referring to FIG. 42, battery cells 72 to which the above-described caps are applied and/or battery cells 72 to which the above-described manufacturing method are applied may be accommodated in a housing 71 of a battery pack 70. The battery pack 70 may be formed using battery modules, each of which is an intermediate form of an assembly, or as shown in the drawing, the battery pack 70 may be directly formed without the battery modules.

Since the above-described battery cells 72 themselves have a large volume, there is no particular difficulty in fabricating the battery pack 70 without using an intermediate structure such as a battery module. In addition, since the second electrodes of the battery cells 72 are connected through the cap, internal resistance is low and energy density is higher. Therefore, the energy density of the battery pack as implemented is expected to be higher.

Figure 43:
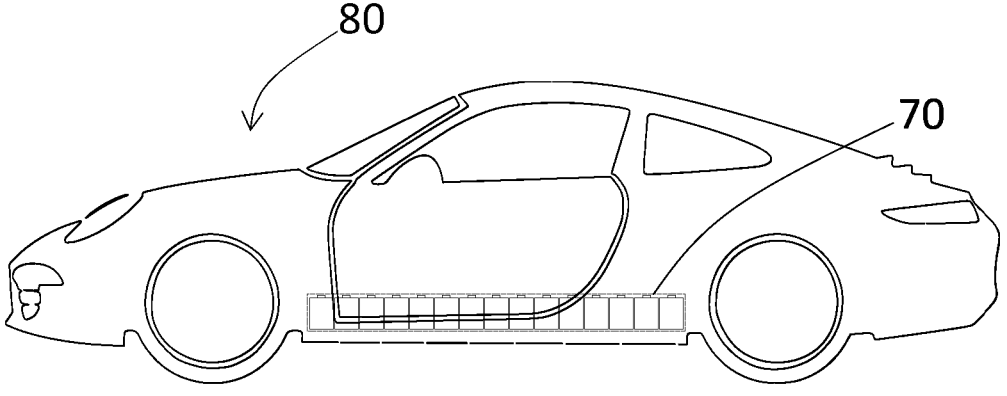
FIG. 43 is a diagram illustrating a vehicle equipped with the battery pack of FIG. 42.

The battery pack 70 having an increased energy density may store the same energy while having a reduced volume and weight. Therefore, as shown in FIG. 43, when the battery pack 70 in which the battery cells 72 are utilized is mounted in a vehicle, such as a vehicle 80 using electricity as an energy source, it is possible to further increase the energy, and thus mileage, of the vehicle.

It should be understood that the described embodiments are illustrative in all respects and not restrictive, and the scope of the present invention will be indicated by the following claims rather than the described detailed description. Also, the meaning and scope of the claims below, as well as all changes and modifications derived from equivalent concepts, should be interpreted as being included in the scope of the present invention.

Although the present invention has been described with reference to the exemplified drawings, it is to be understood that the present invention is not limited to the embodiments and drawings disclosed in this specification, and those skilled in the art will appreciate that various modifications are possible without departing from the scope and idea of the present invention. Further, although not all operating effects according to the configurations of the present invention are not explicitly described in describing embodiments of the present invention, it should be appreciated that predictable effects from the configurations are also recognized.

What is claimed is:

1. A battery cell comprising:
   a battery can including a side wall extending in an axial direction between a closed first end and an open second end, the open second end defining an opening into an interior of the battery can;
   an electrode assembly including a first electrode and a second electrode, the electrode assembly being received within the interior of the battery can so that at least one tab extending from the second electrode is positioned proximate the open second end of the battery can; and
   a cap positioned to close the open second end of the battery can by covering the opening at the second end, the cap comprising an electrically conductive material, the electrically conductive material along a radially outer edge of the cap being in electrical contact with the side wall of the battery can at the open second end, the cap including a vent defined by a weakened portion of the cap extending in a circumferential direction about a center of the cap so as to radially divide the cap between a radially outer region positioned radially outside of the vent along the radially outer edge of the cap and a radially inner region positioned radially inwardly of and encircled by the vent, the radially inner region of the cap including a plurality of electrode connecting portions protruding into the interior of the battery can along the axial direction so as to make direct electrical contact with the at least one tab of the second electrode, the plurality of electrode connecting portions being spaced apart from one another in the circumferential direction about the center of the cap,
   wherein the vent is configured to be broken due to an increase of internal pressure in the interior of the battery can so as to sever an electrical connection between the electrode connecting portions and the battery can and so as to also discharge gas causing the increase of internal pressure.

2. The battery cell of claim 1, wherein the plurality of electrode connecting portions and the at least one tab of the second electrode are connected by a welded portion.

3. The battery cell of claim 1, wherein the at least one tab includes a plurality of tabs extending along a radial direction orthogonal to the axial direction, such that the plurality of tabs at least partially overlap one another along the axial direction.

4. The battery cell of claim 1, wherein each of the plurality of electrode connecting portions are elongated along a radial direction of the cap.

5. The battery cell of claim 1, wherein the plurality of electrode connecting portions include four electrode connecting portions equally spaced apart in the circumferential direction.

6. The battery cell of claim 5, wherein each of the plurality of electrode connecting portions is elongated linearly along a respective radial direction.

7. The battery cell of claim 1, wherein the plurality of electrode connecting portions are joined to one another by a protruding portion of the cap in a radially central region of the cap, the protruding portion of the cap protruding into the interior of the battery can along the axial direction.

8. The battery cell of claim 1, wherein the plurality of electrode connecting portions are joined to one another by a protruding portion of the cap protruding into the interior of the battery can along the axial direction, wherein the vent is positioned along a bottom of the protruding portion of the cap.

9. The battery cell of claim 1, wherein the plurality of electrode connecting portions are monolithically formed with the electrically conductive material of the cap.

10. The battery cell of claim 9, wherein each of the plurality of electrode connecting portions corresponds to a respective recess formed in the outer surface of the cap.

11. The battery cell of claim 1, wherein intermediate regions of the cap are defined between the circumferentially spaced apart plurality of electrode connecting portions, the intermediate regions of the cap being disposed farther away from the interior of the battery can along the axial direction than the contact surfaces of the plurality of electrode connecting portions, and wherein the central protruding region of the cap directly adjoins the intermediate regions in a radial direction.

12. The battery cell of claim 1, wherein:

a first electrode terminal is positioned along the closed first end of the battery can, the first electrode terminal being electrically insulated from the closed first end of the battery can; and the first electrode of the electrode assembly is electrically connected to the first electrode terminal via a first current collector plate positioned between the electrode assembly and the closed first end of the battery can in the axial direction.

13. The battery cell of claim 1, wherein the cap is constructed and arranged such that an outermost extremity of the cap along the axial direction away from the interior of the battery can is spaced farther from the interior of the battery can along the axial direction than the open second end of the battery can.

14. The battery cell of claim 1, wherein at least two of the plurality of electrode connecting portions are positioned on opposing sides of the center of the cap such that a straight line connecting the at least two of the electrode connecting portions would extend through the center of the cap.

15. The battery cell of claim 1, wherein at least two of the plurality of electrode connecting portions are elongated along a radial direction on opposing sides of the center of the cap.

16. The battery cell of claim 15, wherein the at least two of the plurality of electrode connecting portions are elongated linearly along a straight line extending through the center of the cap.

17. The battery cell of claim 1, wherein the cap includes a liquid inlet in a central portion of the cap, the liquid inlet being positioned on a central protruding region of the cap, the central protruding region being disposed farther away from the interior of the battery can along the axial direction than a respective contact surface of each of the plurality of electrode connecting portions, the contact surfaces making the direct electrical contact with the at least one tab of the second electrode, and wherein intermediate regions of the cap are defined between the circumferentially spaced apart plurality of electrode connecting portions, the intermediate regions of the cap being disposed farther away from the interior of the battery can along the axial direction than the contact surfaces of the plurality of electrode connecting portions, and wherein the central protruding region of the cap is spaced apart radially from the intermediate regions by a portion of an outer surface of the cap disposed closer to the interior of the battery can along the axial direction than the central protruding region and the intermediate regions, the outer surface of the cap facing away from the interior of the battery can along the axial direction.

18. The battery cell of claim 17, wherein at least two of the plurality of the electrode connecting portions are elongated linearly along opposing radial directions.

19. The battery cell of claim 17, wherein the central protruding region of the cap is disposed closer to the interior of the battery can along the axial direction than an outermost extremity of the cap along the axial direction.

20. The battery cell of claim 19, further comprising a stopper covering the liquid inlet, wherein an uppermost end of the stopper along the axial direction is disposed closer to the interior of the battery can along the axial direction than the outermost extremity of the cap along the axial direction.

21. A battery pack including the battery cell of claim 1.

22. A vehicle including the battery pack of claim 21.

23. A method of manufacturing a battery cell, comprising:

assembling the battery cell of claim 1 by positioning the electrode assembly in the interior of the battery can and positioning the cap to cover the opening at the second end of the battery can so as to close the second end of the battery can;

after assembling the battery cell, bonding the plurality of electrode connecting portions to the at least one tab of the second electrode;

bonding the cap to the battery can; and injecting an electrolyte into the battery can.

24. The method of claim 23, wherein the injecting of the electrolyte into the battery can is via a liquid inlet in a central portion of the cap.

25. The method of claim 24, further comprising covering the liquid inlet with a stopper.

26. The method of claim 23, wherein the bonding of the plurality of electrode connecting portions to the at least one tab of the second electrode is performed by laser irradiation of an outer surface of the cap facing away from the interior of the battery can along the axial direction.

* * * * *